US011896859B2

(12) United States Patent
Pilz et al.

(10) Patent No.: US 11,896,859 B2
(45) Date of Patent: Feb. 13, 2024

(54) WALL GAP FIRE BLOCK DEVICE, SYSTEM AND METHOD

(71) Applicant: CEMCO, LLC, City of Industry, CA (US)

(72) Inventors: Donald Anthony Pilz, Livermore, CA (US); Raymond E. Poliquin, City of Industry, CA (US)

(73) Assignee: CEMCO, LLC, City of Industry, CA (US)

( * ) Notice: Subject to any disclaimer, the term of this patent is extended or adjusted under 35 U.S.C. 154(b) by 0 days.

(21) Appl. No.: 17/450,163

(22) Filed: Oct. 6, 2021

(65) Prior Publication Data

US 2022/0023684 A1 Jan. 27, 2022

Related U.S. Application Data

(63) Continuation of application No. 16/519,500, filed on Jul. 23, 2019, now Pat. No. 11,141,613, which is a (Continued)

(51) Int. Cl.

*A62C 2/06* (2006.01)
*E04B 1/94* (2006.01)
(Continued)

(52) U.S. Cl.

CPC .............. *A62C 2/065* (2013.01); *E04B 1/943* (2013.01); *E04B 1/946* (2013.01); *E04B 1/947* (2013.01);
(Continued)

(58) Field of Classification Search

CPC ......... A62C 2/065; E04B 1/943; E04B 1/946; E04B 1/947; E04B 1/948; E04B 2/58; E04B 2/7411; E04B 2/7457
(Continued)

(56) References Cited

U.S. PATENT DOCUMENTS

| | | | |
|---|---|---|---|
| 661,832 | A | 11/1900 | Wilkinson |
| 716,628 | A | 12/1902 | Dickey |

(Continued)

FOREIGN PATENT DOCUMENTS

| | | |
|---|---|---|
| CA | 2234347 | 10/1999 |
| CA | 2711659 | 2/2012 |

(Continued)

OTHER PUBLICATIONS

U.S. Appl. No. 17/653,771, filed Mar. 7, 2022, Pilz.

(Continued)

*Primary Examiner* — Brian D Mattei
*Assistant Examiner* — Joseph J. Sadlon
(74) *Attorney, Agent, or Firm* — Knobbe, Martens, Olson & Bear, LLP

(57) ABSTRACT

Fire block devices for application to a wall component, a wall component with a fire block device and wall assemblies including the same. The fire-block device can be a wall component that includes a fire-resistant material strip that expands in response to sufficient heat to create a fire-resistant barrier. In some applications, the fire-block wall component is positioned to extend lengthwise along and across a gap between wallboard members. The fire-block wall component may have a central portion and a pair of side portions extending in opposite directions from the central portion. The fire-resistant material may be positioned on the central portion of the fire-block device. The central portion may be positioned within the gap such that the fire-resistant material expands in response to sufficient heat to create a fire-resistant barrier.

20 Claims, 8 Drawing Sheets

Related U.S. Application Data continuation of application No. 15/943,349, filed on Apr. 2, 2018, now Pat. No. 10,406,389, which is a continuation of application No. 15/481,272, filed on Apr. 6, 2017, now Pat. No. 9,931,527, which is a continuation of application No. 15/186,233, filed on Jun. 17, 2016, now Pat. No. 9,616,259, which is a continuation of application No. 14/603,785, filed on Jan. 23, 2015, now Pat. No. 9,371,644, which is a continuation of application No. 14/213,869, filed on Mar. 14, 2014, now Pat. No. 8,938,922, which is a continuation of application No. 13/740,024, filed on Jan. 11, 2013, now Pat. No. 8,671,632, which is a continuation-in-part of application No. 12/887,400, filed on Sep. 21, 2010, now Pat. No. 8,353,139.

(60) Provisional application No. 61/244,277, filed on Sep. 21, 2009.

(51) Int. Cl.
*E04B 2/58* (2006.01)
*E04B 2/74* (2006.01)

(52) U.S. Cl.
CPC ................ *E04B 1/948* (2013.01); *E04B 2/58* (2013.01); *E04B 2/7411* (2013.01); *E04B 2/7457* (2013.01)

(58) Field of Classification Search
USPC ........................................................... 52/232
See application file for complete search history.

(56) References Cited

U.S. PATENT DOCUMENTS

| | | | | | |
|---|---|---|---|---|---|
| 965,595 | A | | 7/1910 | Nicholson | |
| 1,130,722 | A | | 3/1915 | Fletcher | |
| 1,563,651 | A | | 12/1925 | Pomerantz | |
| 1,719,728 | A | | 7/1929 | Saunders | |
| 2,020,576 | A | * | 11/1935 | Runde | E04F 13/16 52/515 |
| 2,105,771 | A | | 1/1938 | Holdsworth | |
| 2,114,386 | A | | 4/1938 | Killion | |
| 2,218,426 | A | | 10/1940 | Hulbert, Jr. | |
| 2,556,878 | A | | 6/1951 | Kohlhaas | |
| 2,664,739 | A | | 1/1954 | Marcy | |
| 2,683,927 | A | | 7/1954 | Maronek | |
| 2,688,927 | A | | 9/1954 | Nuebling | |
| 2,733,786 | A | | 2/1956 | Drake | |
| 3,041,682 | A | | 7/1962 | Alderfer et al. | |
| 3,129,792 | A | | 4/1964 | Gwynne | |
| 3,153,467 | A | | 10/1964 | Nelsson et al. | |
| 3,271,920 | A | | 9/1966 | Downing, Jr. | |
| 3,309,826 | A | | 3/1967 | Zinn | |
| 3,324,615 | A | | 6/1967 | Zinn | |
| 3,346,909 | A | | 10/1967 | Blackburn | |
| 3,355,852 | A | | 12/1967 | Lally | |
| 3,397,495 | A | | 8/1968 | Thompson | |
| 3,460,302 | A | | 8/1969 | Cooper | |
| 3,481,090 | A | | 12/1969 | Lizee | |
| 3,495,417 | A | * | 2/1970 | Ratliff, Jr. | E04B 1/942 52/168 |
| 3,537,219 | A | | 11/1970 | Navarre | |
| 3,562,985 | A | | 2/1971 | Nicosia | |
| 3,566,559 | A | | 3/1971 | Dickson | |
| 3,604,167 | A | | 9/1971 | Hays | |
| 3,609,933 | A | | 10/1971 | Jahn et al. | |
| 3,648,419 | A | | 3/1972 | Marks | |
| 3,668,041 | A | | 6/1972 | Lonning | |
| 3,683,569 | A | | 8/1972 | Holm | |
| 3,696,569 | A | | 10/1972 | Didry | |
| 3,707,819 | A | | 1/1973 | Calhoun et al. | |
| 3,713,263 | A | | 1/1973 | Mullen | |
| 3,730,477 | A | | 5/1973 | Wavrunek | |
| 3,744,199 | A | | 7/1973 | Navarre | |
| 3,757,480 | A | | 9/1973 | Young | |
| 3,786,604 | A | | 1/1974 | Kramer | |
| 3,837,126 | A | | 9/1974 | Voiturier et al. | |
| 3,839,839 | A | | 10/1974 | Tillisch et al. | |
| 3,866,370 | A | | 2/1975 | Guarino et al. | |
| 3,908,328 | A | | 9/1975 | Nelsson | |
| 3,921,346 | A | | 11/1975 | Sauer et al. | |
| 3,922,830 | A | | 12/1975 | Guarino et al. | |
| 3,934,066 | A | | 1/1976 | Murch | |
| 3,935,681 | A | | 2/1976 | Voiturier et al. | |
| 3,955,330 | A | | 5/1976 | Wendt | |
| 3,964,214 | A | | 6/1976 | Wendt | |
| 3,974,607 | A | | 8/1976 | Balinski | |
| 3,976,825 | A | | 8/1976 | Anderberg | |
| 3,998,027 | A | | 12/1976 | Wendt et al. | |
| 4,011,704 | A | | 3/1977 | O'Konski | |
| 4,103,463 | A | | 8/1978 | Dixon | |
| 4,122,203 | A | | 10/1978 | Stahl | |
| 4,130,972 | A | | 12/1978 | Varlonga | |
| 4,139,664 | A | | 2/1979 | Rick | |
| 4,144,335 | A | | 3/1979 | Edwards | |
| 4,144,385 | A | | 3/1979 | Downing | |
| 4,152,878 | A | | 5/1979 | Balinski | |
| 4,164,107 | A | | 8/1979 | Kraemling et al. | |
| 4,178,728 | A | | 12/1979 | Ortmanns et al. | |
| 4,197,687 | A | | 4/1980 | Benoit | |
| 4,203,264 | A | | 5/1980 | Kiefer et al. | |
| 4,205,498 | A | | 6/1980 | Unayama | |
| 4,217,731 | A | | 8/1980 | Saino | |
| 4,269,890 | A | | 5/1981 | Breitling et al. | |
| 4,276,332 | A | | 6/1981 | Castle | |
| 4,281,494 | A | | 8/1981 | Weinar | |
| 4,283,892 | A | | 8/1981 | Brown | |
| 4,295,304 | A | | 10/1981 | Kim | |
| 4,318,253 | A | | 3/1982 | Wedel | |
| 4,324,835 | A | | 4/1982 | Keen | |
| 4,329,820 | A | | 5/1982 | Wendt | |
| 4,356,672 | A | | 11/1982 | Beckman et al. | |
| 4,361,994 | A | | 12/1982 | Carver | |
| 4,424,653 | A | | 1/1984 | Heinen | |
| 4,433,732 | A | | 2/1984 | Licht et al. | |
| 4,434,592 | A | | 3/1984 | Reneault et al. | |
| 4,437,274 | A | | 3/1984 | Slocum et al. | |
| 4,454,690 | A | | 6/1984 | Dixon | |
| 4,461,120 | A | | 7/1984 | Hemmerling | |
| 4,467,578 | A | | 8/1984 | Weinar | |
| 4,480,419 | A | | 11/1984 | Crites | |
| 4,495,238 | A | | 1/1985 | Adiletta | |
| 4,497,150 | A | | 2/1985 | Wendt et al. | |
| 4,507,901 | A | | 4/1985 | Carroll | |
| 4,509,559 | A | | 4/1985 | Cheetham et al. | |
| 4,517,782 | A | | 5/1985 | Shamszadeh | |
| 4,574,454 | A | * | 3/1986 | Dyson | E05G 1/024 264/261 |
| 4,575,979 | A | | 3/1986 | Mariani | |
| 4,578,913 | A | | 4/1986 | Eich | |
| 4,598,516 | A | | 7/1986 | Groshong | |
| 4,622,794 | A | | 11/1986 | Geortner | |
| 4,632,865 | A | | 12/1986 | Tzur | |
| 4,649,089 | A | | 3/1987 | Thwaites | |
| 4,663,204 | A | * | 5/1987 | Langham | B32B 3/30 428/920 |
| 4,672,785 | A | | 6/1987 | Salvo | |
| 4,709,517 | A | | 12/1987 | Mitchell et al. | |
| 4,711,183 | A | | 12/1987 | Handler et al. | |
| 4,723,385 | A | | 2/1988 | Kallstrom | |
| 4,756,945 | A | | 7/1988 | Gibb | |
| 4,761,927 | A | | 8/1988 | O'Keeffe et al. | |
| 4,787,767 | A | | 11/1988 | Wendt | |
| 4,805,364 | A | | 2/1989 | Smolik | |
| 4,810,986 | A | | 3/1989 | Leupold | |
| 4,822,659 | A | | 4/1989 | Anderson et al. | |
| 4,825,610 | A | | 5/1989 | Gasteiger | |
| 4,830,913 | A | * | 5/1989 | Ortmans | C23F 11/18 428/432 |
| 4,845,904 | A | | 7/1989 | Menchetti | |

(56) References Cited

U.S. PATENT DOCUMENTS

| | | | | | |
|---|---|---|---|---|---|
| 4,850,173 | A | * | 7/1989 | Beyer | E06B 5/16 52/232 |
| 4,850,385 | A | | 7/1989 | Harbeke | |
| 4,854,096 | A | | 8/1989 | Smolik | |
| 4,854,107 | A | * | 8/1989 | Roberts | E04B 9/005 52/834 |
| 4,866,898 | A | | 9/1989 | LaRoche et al. | |
| 4,881,352 | A | | 11/1989 | Glockenstein | |
| 4,885,884 | A | | 12/1989 | Schilger | |
| 4,897,976 | A | | 2/1990 | Williams et al. | |
| 4,899,510 | A | | 2/1990 | Propst | |
| 4,914,880 | A | | 4/1990 | Albertini | |
| 4,918,761 | A | | 4/1990 | Harbeke | |
| 4,930,276 | A | | 6/1990 | Bawa et al. | |
| 4,935,281 | A | | 6/1990 | Tolbert et al. | |
| 4,982,540 | A | | 1/1991 | Thompson | |
| 4,986,040 | A | * | 1/1991 | Prewer | B66B 11/005 52/79.5 |
| 4,987,719 | A | | 1/1991 | Goodson, Jr. | |
| 4,992,310 | A | | 2/1991 | Gelb et al. | |
| 5,010,702 | A | | 4/1991 | Daw et al. | |
| 5,058,342 | A | * | 10/1991 | Crompton | C04B 14/22 428/920 |
| 5,090,170 | A | | 2/1992 | Propst | |
| 5,094,780 | A | | 3/1992 | von Bonin | |
| 5,103,589 | A | | 4/1992 | Crawford | |
| 5,105,594 | A | | 4/1992 | Kirchner | |
| 5,111,579 | A | | 5/1992 | Andersen | |
| 5,125,203 | A | | 6/1992 | Daw | |
| 5,127,203 | A | | 7/1992 | Paquette | |
| 5,127,760 | A | | 7/1992 | Brady | |
| 5,140,792 | A | | 8/1992 | Daw et al. | |
| 5,146,723 | A | | 9/1992 | Greenwood et al. | |
| 5,152,113 | A | | 10/1992 | Guddas | |
| 5,155,957 | A | | 10/1992 | Robertson et al. | |
| 5,157,883 | A | | 10/1992 | Meyer | |
| 5,157,887 | A | | 10/1992 | Watterworth, III | |
| 5,167,876 | A | | 12/1992 | Lem | |
| 5,173,515 | A | | 12/1992 | von Bonin et al. | |
| 5,203,132 | A | | 4/1993 | Smolik | |
| 5,205,099 | A | | 4/1993 | Grünhage et al. | |
| 5,212,914 | A | | 5/1993 | Martin et al. | |
| 5,214,894 | A | * | 6/1993 | Glesser-Lott | E04B 1/76 52/408 |
| 5,222,335 | A | | 6/1993 | Petrecca | |
| 5,228,254 | A | * | 7/1993 | Honeycutt, Jr. | E04B 2/7407 52/468 |
| 5,244,709 | A | | 9/1993 | Vanderstukken | |
| 5,279,091 | A | | 1/1994 | Williams et al. | |
| 5,282,615 | A | | 2/1994 | Green et al. | |
| 5,285,615 | A | | 2/1994 | Gilmour | |
| 5,315,804 | A | | 5/1994 | Attalla | |
| 5,319,339 | A | | 6/1994 | Leupold | |
| 5,325,651 | A | | 7/1994 | Meyer et al. | |
| 5,339,577 | A | * | 8/1994 | Snyder | E04B 9/0414 52/783.17 |
| 5,347,780 | A | | 9/1994 | Richards et al. | |
| 5,367,850 | A | | 11/1994 | Nicholas | |
| 5,374,036 | A | | 12/1994 | Rogers et al. | |
| 5,376,429 | A | | 12/1994 | McGroarty | |
| 5,390,458 | A | | 2/1995 | Menchetti | |
| 5,390,465 | A | | 2/1995 | Rajecki | |
| 5,394,665 | A | | 3/1995 | Johnson | |
| 5,412,919 | A | | 5/1995 | Pellock et al. | |
| 5,433,991 | A | | 7/1995 | Boyd, Jr. et al. | |
| 5,452,551 | A | | 9/1995 | Charland et al. | |
| 5,454,203 | A | | 10/1995 | Turner | |
| 5,456,050 | A | | 10/1995 | Ward | |
| 5,460,864 | A | | 10/1995 | Heitkamp | |
| 5,471,791 | A | | 12/1995 | Keller | |
| 5,471,805 | A | | 12/1995 | Becker | |
| 5,475,961 | A | * | 12/1995 | Menchetti | E04B 2/7411 52/282.1 |
| 5,477,652 | A | | 12/1995 | Torrey et al. | |
| 5,502,937 | A | | 4/1996 | Wilson | |
| 5,531,051 | A | | 7/1996 | Chenier, Jr. et al. | |
| 5,552,185 | A | | 9/1996 | De Keyser | |
| 5,592,796 | A | | 1/1997 | Landers | |
| 5,604,024 | A | | 2/1997 | von Bonin | |
| 5,607,758 | A | | 3/1997 | Schwartz | |
| 5,644,877 | A | | 7/1997 | Wood | |
| 5,687,538 | A | | 11/1997 | Frobosilo et al. | |
| 5,689,922 | A | | 11/1997 | Daudet | |
| 5,709,821 | A | | 1/1998 | von Bonin et al. | |
| 5,724,784 | A | | 3/1998 | Menchetti | |
| 5,735,100 | A | | 4/1998 | Campbell | |
| 5,740,635 | A | | 4/1998 | Gil et al. | |
| 5,740,643 | A | | 4/1998 | Huntley | |
| 5,755,066 | A | | 5/1998 | Becker | |
| 5,765,332 | A | | 6/1998 | Landin et al. | |
| 5,787,651 | A | | 8/1998 | Horn et al. | |
| 5,797,233 | A | | 8/1998 | Hascall | |
| 5,798,679 | A | | 8/1998 | Pissanetzky | |
| 5,806,261 | A | | 9/1998 | Huebner et al. | |
| 5,820,958 | A | | 10/1998 | Swallow | |
| 5,822,935 | A | | 10/1998 | Mitchell et al. | |
| 5,870,866 | A | | 2/1999 | Herndon | |
| 5,913,788 | A | | 6/1999 | Herren | |
| 5,921,041 | A | | 7/1999 | Egri, II | |
| 5,927,041 | A | | 7/1999 | Sedlmeier et al. | |
| 5,930,963 | A | | 8/1999 | Nichols | |
| 5,930,968 | A | | 8/1999 | Pullman | |
| 5,945,182 | A | | 8/1999 | Fowler et al. | |
| 5,950,385 | A | | 9/1999 | Herren | |
| 5,968,615 | A | | 10/1999 | Schlappa | |
| 5,968,669 | A | | 10/1999 | Liu et al. | |
| 5,970,672 | A | | 10/1999 | Robinson | |
| 5,974,750 | A | | 11/1999 | Landin et al. | |
| 5,974,753 | A | | 11/1999 | Hsu | |
| 6,023,898 | A | | 2/2000 | Josey | |
| 6,058,668 | A | | 5/2000 | Herren | |
| 6,061,985 | A | | 5/2000 | Kraus et al. | |
| 6,110,559 | A | | 8/2000 | De Keyser | |
| 6,116,404 | A | | 9/2000 | Heuft et al. | |
| 6,119,411 | A | | 9/2000 | Mateu Gil et al. | |
| 6,128,874 | A | | 10/2000 | Olson et al. | |
| 6,128,877 | A | | 10/2000 | Goodman et al. | |
| 6,131,352 | A | | 10/2000 | Barnes et al. | |
| 6,151,858 | A | | 11/2000 | Ruiz et al. | |
| 6,153,668 | A | | 11/2000 | Gestner et al. | |
| 6,176,053 | B1 | | 1/2001 | St. Germain | |
| 6,182,407 | B1 | | 2/2001 | Turpin et al. | |
| 6,189,277 | B1 | | 2/2001 | Boscamp | |
| 6,207,077 | B1 | | 3/2001 | Burnell-Jones | |
| 6,207,085 | B1 | | 3/2001 | Ackerman | |
| 6,213,679 | B1 | | 4/2001 | Frobosilo et al. | |
| 6,216,404 | B1 | | 4/2001 | Vellrath | |
| 6,233,888 | B1 | | 5/2001 | Wu | |
| 6,256,948 | B1 | | 7/2001 | Van Dreumel | |
| 6,256,960 | B1 | | 7/2001 | Babcock et al. | |
| 6,256,980 | B1 | | 7/2001 | Lecordix et al. | |
| 6,279,289 | B1 | | 8/2001 | Soder et al. | |
| 6,305,133 | B1 | | 10/2001 | Cornwall | |
| 6,318,044 | B1 | | 11/2001 | Campbell | |
| 6,374,558 | B1 | | 4/2002 | Surowiecki | |
| 6,381,913 | B2 | | 5/2002 | Herren | |
| 6,405,502 | B1 | | 6/2002 | Cornwall | |
| 6,408,578 | B1 | | 6/2002 | Tanaka et al. | |
| 6,430,881 | B1 | | 8/2002 | Daudet et al. | |
| 6,470,638 | B1 | | 10/2002 | Larson | |
| 6,487,825 | B1 | | 12/2002 | Silik | |
| 6,574,930 | B2 | | 6/2003 | Kiser | |
| 6,595,383 | B2 | | 7/2003 | Pietrantoni | |
| 6,606,831 | B2 | | 8/2003 | Degelsegger | |
| 6,647,691 | B2 | | 11/2003 | Becker et al. | |
| 6,668,499 | B2 | | 12/2003 | Degelsegger | |
| 6,679,015 | B1 | | 1/2004 | Cornwall | |
| 6,688,499 | B2 | | 2/2004 | Zhang | |
| 6,698,146 | B2 | * | 3/2004 | Morgan | F16L 5/04 52/220.8 |
| 6,705,047 | B2 | | 3/2004 | Yulkowski | |
| 6,708,627 | B1 | | 3/2004 | Wood | |
| 6,711,871 | B2 | | 3/2004 | Beirise et al. | |

(56) References Cited

U.S. PATENT DOCUMENTS 6,732,481 B2 5/2004 Stahl, Sr.
6,739,926 B2 5/2004 Riach et al.
6,748,705 B2 6/2004 Orszulak
6,783,345 B2 8/2004 Morgan et al.
6,792,733 B2 9/2004 Wheeler et al.
6,799,404 B2 10/2004 Spransy
6,843,035 B1 1/2005 Glynn
6,854,237 B2 2/2005 Surowiecki
6,871,470 B1 3/2005 Stover
6,951,162 B1 10/2005 Shockey et al.
6,996,944 B2 * 2/2006 Shaw ...................... E04B 1/948 52/396.01
7,043,880 B2 5/2006 Morgan et al.
7,059,092 B2 6/2006 Harkins et al.
7,104,024 B1 9/2006 deGirolamo et al.
7,152,385 B2 12/2006 Morgan et al.
7,191,845 B2 3/2007 Loar
7,240,905 B1 7/2007 Stahl
7,251,918 B2 8/2007 Reif et al.
7,302,776 B2 12/2007 Duncan et al.
7,398,856 B2 7/2008 Foster et al.
7,413,024 B1 8/2008 Simontacchi et al.
7,441,565 B2 * 10/2008 Imamura .............. H02G 3/0412 169/48
7,487,591 B2 2/2009 Harkins et al.
7,497,056 B2 3/2009 Surowiecki
7,506,478 B2 3/2009 Bobenhausen
7,513,082 B2 4/2009 Johnson
7,540,118 B2 6/2009 Jensen
7,594,331 B2 9/2009 Andrews et al.
7,603,823 B2 10/2009 Cann
7,610,725 B2 11/2009 Willert
7,617,643 B2 11/2009 Pilz et al.
7,681,365 B2 3/2010 Klein
7,685,792 B2 3/2010 Stahl, Sr. et al.
7,716,891 B2 5/2010 Radford
7,735,295 B2 6/2010 Surowiecki
7,752,817 B2 7/2010 Pilz et al.
7,775,006 B2 * 8/2010 Giannos .................. E04B 1/948 52/236.7
7,776,170 B2 8/2010 Yu et al.
7,797,893 B2 9/2010 Stahl, Sr. et al.
7,810,295 B2 10/2010 Thompson
7,814,718 B2 10/2010 Klein
7,827,738 B2 11/2010 Abrams et al.
7,836,652 B2 11/2010 Futterman
7,866,108 B2 1/2011 Klein
7,870,698 B2 1/2011 Tonyan et al.
7,921,537 B2 4/2011 Rodlin
7,921,614 B2 4/2011 Fortin et al.
7,941,981 B2 5/2011 Shaw
7,950,198 B2 5/2011 Pilz et al.
7,984,592 B1 7/2011 Jiras
8,029,345 B2 * 10/2011 Messmer ............... A62C 2/065 454/286
8,056,293 B2 11/2011 Klein
8,061,099 B2 11/2011 Andrews
8,062,108 B2 11/2011 Carlson et al.
8,069,625 B2 12/2011 Harkins et al.
8,074,412 B1 12/2011 Gogan et al.
8,074,416 B2 12/2011 Andrews
8,079,188 B2 12/2011 Swartz et al.
8,087,205 B2 1/2012 Pilz et al.
8,100,164 B2 1/2012 Goodman et al.
8,132,376 B2 3/2012 Pilz et al.
8,136,314 B2 3/2012 Klein
8,151,526 B2 4/2012 Klein
8,181,404 B2 5/2012 Klein
8,225,581 B2 7/2012 Strickland et al.
8,281,552 B2 10/2012 Pilz et al.
8,286,397 B2 * 10/2012 Shaw ...................... E04B 1/948 52/396.01
8,318,304 B2 11/2012 Valenziano
8,322,094 B2 12/2012 Pilz et al.
8,353,139 B2 1/2013 Pilz
8,375,666 B2 2/2013 Stahl, Jr. et al.
8,389,107 B2 3/2013 Riebel et al.
8,413,394 B2 4/2013 Pilz et al.
8,468,759 B2 6/2013 Klein
8,495,844 B1 7/2013 Johnson
8,499,512 B2 8/2013 Pilz et al.
8,541,084 B2 9/2013 Deiss et al.
8,544,226 B2 10/2013 Rubel
8,555,566 B2 10/2013 Pilz et al.
8,578,672 B2 11/2013 Mattox et al.
8,584,415 B2 11/2013 Stahl, Jr. et al.
8,590,231 B2 11/2013 Pilz
8,595,999 B1 12/2013 Pilz et al.
8,596,019 B2 12/2013 Aitken
8,601,760 B2 12/2013 Hilburn, Jr.
8,607,519 B2 12/2013 Hilburn
8,640,415 B2 2/2014 Pilz et al.
8,646,235 B2 2/2014 Hilburn, Jr.
8,671,632 B2 3/2014 Pilz et al.
8,728,608 B2 5/2014 Maisch
8,782,977 B2 7/2014 Burgess
8,793,947 B2 8/2014 Pilz et al.
8,826,599 B2 9/2014 Stahl
8,871,326 B2 10/2014 Flennert
8,938,922 B2 1/2015 Pilz et al.
8,950,132 B2 2/2015 Collins et al.
8,955,275 B2 2/2015 Stahl, Jr.
8,973,319 B2 3/2015 Pilz et al.
9,045,899 B2 6/2015 Pilz et al.
9,127,454 B2 9/2015 Pilz et al.
9,151,042 B2 10/2015 Simon et al.
9,157,232 B2 10/2015 Stahl, Jr.
9,206,596 B1 12/2015 Robinson
9,284,730 B2 3/2016 Klein
9,290,932 B2 3/2016 Pilz et al.
9,290,934 B2 3/2016 Pilz et al.
9,316,133 B2 4/2016 Schnitta
9,371,644 B2 6/2016 Pilz et al.
9,458,628 B2 10/2016 Pilz et al.
9,481,998 B2 11/2016 Pilz et al.
9,506,246 B2 11/2016 Joseph et al.
9,512,614 B2 12/2016 Klein et al.
9,523,193 B2 12/2016 Pilz
9,551,148 B2 1/2017 Pilz
9,616,259 B2 4/2017 Pilz et al.
9,637,914 B2 5/2017 Pilz et al.
9,683,364 B2 6/2017 Pilz et al.
9,719,253 B2 8/2017 Stahl, Jr. et al.
9,739,052 B2 8/2017 Pilz et al.
9,739,054 B2 8/2017 Pilz et al.
9,752,318 B2 9/2017 Pilz
9,879,421 B2 1/2018 Pilz
9,885,178 B1 2/2018 Barnes et al.
9,909,298 B2 3/2018 Pilz
9,931,527 B2 4/2018 Pilz et al.
9,995,039 B2 6/2018 Pilz et al.
10,000,923 B2 6/2018 Pilz
10,011,983 B2 7/2018 Pilz et al.
10,077,550 B2 9/2018 Pilz
10,166,418 B2 1/2019 Foerg et al.
10,174,499 B1 1/2019 Tinianov et al.
10,184,246 B2 1/2019 Pilz et al.
10,214,901 B2 2/2019 Pilz et al.
10,227,775 B2 3/2019 Pilz et al.
10,246,871 B2 4/2019 Pilz
10,323,411 B2 6/2019 Ackerman et al.
10,406,389 B2 9/2019 Pilz et al.
10,472,819 B2 11/2019 Klein et al.
10,494,818 B2 12/2019 Maziarz
10,563,399 B2 2/2020 Pilz et al.
10,619,347 B2 4/2020 Pilz et al.
10,626,598 B2 4/2020 Klein
10,669,710 B2 6/2020 Förg
10,689,842 B2 6/2020 Pilz
10,731,338 B1 8/2020 Zemler et al.
10,753,084 B2 8/2020 Pilz et al.
10,900,223 B2 1/2021 Pilz
10,914,065 B2 2/2021 Pilz

(56) References Cited

U.S. PATENT DOCUMENTS

| | | | |
|---|---|---|---|
| 10,920,416 | B2 | 2/2021 | Klein et al. |
| 10,954,670 | B2 | 3/2021 | Pilz |
| 11,041,306 | B2 | 6/2021 | Pilz et al. |
| 11,060,283 | B2 | 7/2021 | Pilz et al. |
| 11,111,666 | B2 | 9/2021 | Pilz |
| 11,118,346 | B2 | 9/2021 | Klein et al. |
| 11,141,613 | B2 | 10/2021 | Pilz et al. |
| 11,162,259 | B2 | 11/2021 | Pilz |
| 11,230,839 | B2 | 1/2022 | Klein et al. |
| 11,268,274 | B2 | 3/2022 | Pilz |
| 11,313,121 | B2 | 4/2022 | Quirijns et al. |
| 11,466,449 | B2 | 10/2022 | Pilz et al. |
| 11,486,150 | B2 | 11/2022 | Stahl et al. |
| 11,512,464 | B2 | 11/2022 | Klein |
| 11,560,712 | B2 | 1/2023 | Pilz et al. |
| 2002/0029535 | A1 | 3/2002 | Loper |
| 2002/0095908 | A1 | 7/2002 | Kiser |
| 2002/0160149 | A1 | 10/2002 | Garofalo |
| 2002/0170249 | A1 | 11/2002 | Yulkowski |
| 2003/0079425 | A1 | 5/2003 | Morgan et al. |
| 2003/0089062 | A1 | 5/2003 | Morgan et al. |
| 2003/0196401 | A1 | 10/2003 | Surowiecki |
| 2003/0213211 | A1 | 11/2003 | Morgan et al. |
| 2004/0010998 | A1 | 1/2004 | Turco |
| 2004/0016191 | A1 | 1/2004 | Whitty |
| 2004/0045234 | A1 | 3/2004 | Morgan et al. |
| 2004/0139684 | A1 | 7/2004 | Menendez |
| 2004/0149390 | A1 | 8/2004 | Monden et al. |
| 2004/0157012 | A1 | 8/2004 | Miller et al. |
| 2004/0211150 | A1 | 10/2004 | Bobenhausen |
| 2005/0031843 | A1 | 2/2005 | Robinson et al. |
| 2005/0183361 | A1 | 8/2005 | Frezza |
| 2005/0246973 | A1 | 11/2005 | Jensen |
| 2006/0032163 | A1 | 2/2006 | Korn |
| 2006/0123723 | A1 | 6/2006 | Weir et al. |
| 2006/0137293 | A1 | 6/2006 | Klein |
| 2006/0213138 | A1 | 9/2006 | Milani et al. |
| 2006/0261223 | A1 | 11/2006 | Orndorff, II et al. |
| 2007/0056245 | A1 | 3/2007 | Edmondson |
| 2007/0068101 | A1 | 3/2007 | Weir et al. |
| 2007/0130873 | A1 | 6/2007 | Fisher |
| 2007/0193202 | A1 | 8/2007 | Rice |
| 2007/0261343 | A1 | 11/2007 | Stahl, Sr. |
| 2008/0053013 | A1 | 3/2008 | Tollenaar |
| 2008/0087366 | A1 | 4/2008 | Yu et al. |
| 2008/0134589 | A1 | 6/2008 | Abrams et al. |
| 2008/0172967 | A1 | 7/2008 | Hilburn |
| 2008/0196337 | A1 | 8/2008 | Surowiecki |
| 2008/0250738 | A1 | 10/2008 | Howchin |
| 2009/0090074 | A1 | 4/2009 | Klein |
| 2009/0107064 | A1 | 4/2009 | Bowman |
| 2009/0197060 | A1 | 8/2009 | Cho |
| 2009/0223159 | A1 | 9/2009 | Colon |
| 2009/0282760 | A1 | 11/2009 | Sampson et al. |
| 2010/0126092 | A1 | 5/2010 | Pilz et al. |
| 2010/0170172 | A1 | 7/2010 | Klein |
| 2010/0199583 | A1 | 8/2010 | Behrens et al. |
| 2010/0266781 | A1 | 10/2010 | Kusinski et al. |
| 2011/0011019 | A1 | 1/2011 | Stahl, Jr. et al. |
| 2011/0041415 | A1 | 2/2011 | Esposito |
| 2011/0056163 | A1 | 3/2011 | Kure |
| 2011/0067328 | A1 | 3/2011 | Naccarato et al. |
| 2011/0099928 | A1 | 5/2011 | Klein et al. |
| 2011/0113709 | A1 | 5/2011 | Pilz et al. |
| 2011/0146180 | A1 | 6/2011 | Klein |
| 2011/0167742 | A1 | 7/2011 | Klein |
| 2011/0185656 | A1 | 8/2011 | Klein |
| 2011/0214371 | A1 | 9/2011 | Klein |
| 2011/0247281 | A1 | 10/2011 | Pilz et al. |
| 2011/0262720 | A1 | 10/2011 | Riebel et al. |
| 2011/0274886 | A1 | 11/2011 | Flennert |
| 2011/0302857 | A1 | 12/2011 | McClellan et al. |
| 2012/0023846 | A1 | 2/2012 | Mattox et al. |
| 2012/0180414 | A1 | 7/2012 | Burgess |
| 2012/0247038 | A1 | 10/2012 | Black |
| 2012/0266550 | A1 | 10/2012 | Naccarato et al. |
| 2012/0297710 | A1 | 11/2012 | Klein |
| 2013/0031856 | A1 | 2/2013 | Pilz et al. |
| 2013/0086859 | A1 | 4/2013 | Pilz |
| 2013/0118102 | A1 | 5/2013 | Pilz |
| 2013/0118764 | A1 | 5/2013 | Porter |
| 2013/0205694 | A1 | 8/2013 | Stahl, Jr. |
| 2014/0219719 | A1 | 8/2014 | Hensley et al. |
| 2014/0260017 | A1 | 9/2014 | Noble, III |
| 2015/0086793 | A1 | 3/2015 | Kreysler et al. |
| 2015/0135622 | A1 | 5/2015 | Muenzenberger et al. |
| 2015/0135631 | A1 | 5/2015 | Foerg |
| 2015/0275506 | A1 | 10/2015 | Klein et al. |
| 2015/0275507 | A1 | 10/2015 | Klein et al. |
| 2015/0275510 | A1 | 10/2015 | Klein et al. |
| 2015/0368898 | A1 | 12/2015 | Stahl, Jr. et al. |
| 2016/0016381 | A1 | 1/2016 | Celis et al. |
| 2016/0017598 | A1 | 1/2016 | Klein et al. |
| 2016/0017599 | A1 | 1/2016 | Klein et al. |
| 2016/0097197 | A1 | 4/2016 | Pilz |
| 2016/0130802 | A1 | 5/2016 | Pilz |
| 2016/0201893 | A1 | 7/2016 | Ksiezppolski |
| 2016/0208484 | A1 | 7/2016 | Pilz |
| 2016/0265219 | A1 | 9/2016 | Pilz |
| 2016/0296775 | A1 | 10/2016 | Pilz et al. |
| 2017/0016227 | A1 | 1/2017 | Klein |
| 2017/0044762 | A1 | 2/2017 | Pilz |
| 2017/0130445 | A1 | 5/2017 | Pilz |
| 2017/0175386 | A1 | 6/2017 | Pilz |
| 2017/0191261 | A9 | 7/2017 | Pilz |
| 2017/0198473 | A1 | 7/2017 | Pilz |
| 2017/0234004 | A1 | 8/2017 | Pilz |
| 2017/0234010 | A1 | 8/2017 | Klein |
| 2017/0260741 | A1 | 9/2017 | Ackerman et al. |
| 2017/0306615 | A1 | 10/2017 | Klein et al. |
| 2017/0328057 | A1 | 11/2017 | Pilz |
| 2018/0010333 | A1 | 1/2018 | Foerg |
| 2018/0030723 | A1 | 2/2018 | Pilz |
| 2018/0030726 | A1 | 2/2018 | Pilz |
| 2018/0044913 | A1 | 2/2018 | Klein et al. |
| 2018/0072922 | A1 | 3/2018 | Canale |
| 2018/0171624 | A1 | 6/2018 | Klein et al. |
| 2018/0171646 | A1 | 6/2018 | Stahl et al. |
| 2018/0195282 | A1 | 7/2018 | Pilz |
| 2018/0291619 | A1 | 10/2018 | Ackerman et al. |
| 2018/0347189 | A1 | 12/2018 | Pilz |
| 2018/0363293 | A1 | 12/2018 | Pilz |
| 2019/0284797 | A1 | 9/2019 | Pilz |
| 2019/0284799 | A1 | 9/2019 | Förg |
| 2019/0316348 | A1 | 10/2019 | Pilz |
| 2019/0323234 | A1 | 10/2019 | Watanabe et al. |
| 2019/0323347 | A1 | 10/2019 | Hensley et al. |
| 2019/0330842 | A1 | 10/2019 | Pilz |
| 2019/0338513 | A1 | 11/2019 | Pilz |
| 2019/0344103 | A1 | 11/2019 | Pilz et al. |
| 2019/0360195 | A1 | 11/2019 | Pilz et al. |
| 2020/0080300 | A1 | 3/2020 | Pilz |
| 2020/0240140 | A1 | 7/2020 | Pilz |
| 2020/0284030 | A1 | 9/2020 | Pilz |
| 2020/0308829 | A1 | 10/2020 | Hunsaker |
| 2020/0325679 | A1 | 10/2020 | Pilz |
| 2020/0340240 | A1 | 10/2020 | Pilz |
| 2020/0340242 | A1 | 10/2020 | Pilz |
| 2020/0362551 | A1 | 11/2020 | Klein et al. |
| 2021/0010257 | A1 | 1/2021 | Klein et al. |
| 2021/0017761 | A1 | 1/2021 | Klein et al. |
| 2021/0040731 | A1 | 2/2021 | Pilz |
| 2021/0062502 | A1 | 3/2021 | Archer et al. |
| 2021/0101319 | A1 | 4/2021 | Klein et al. |
| 2021/0148112 | A1 | 5/2021 | Klein |
| 2021/0164222 | A1 | 6/2021 | Pilz |
| 2021/0189721 | A1 | 6/2021 | Klein et al. |
| 2021/0254333 | A1 | 8/2021 | Pilz |
| 2021/0285208 | A1 | 9/2021 | Pilz |
| 2021/0396004 | A1 | 12/2021 | Pilz |
| 2022/0010553 | A1 | 1/2022 | Pilz et al. |
| 2022/0023684 | A1 | 1/2022 | Pilz et al. |
| 2022/0042303 | A1 | 2/2022 | Pilz |
| 2022/0056686 | A1 | 2/2022 | Pilz |

(56) References Cited

U.S. PATENT DOCUMENTS

| | | | |
|---|---|---|---|
| 2022/0098856 | A1 | 3/2022 | Pilz |
| 2022/0162851 | A1 | 5/2022 | Pilz |
| 2022/0259852 | A1 | 8/2022 | Pilz |
| 2022/0268017 | A1 | 8/2022 | Pilz |
| 2022/0349177 | A1 | 11/2022 | Pilz |
| 2023/0114420 | A1 | 4/2023 | Pilz et al. |
| 2023/0115315 | A1 | 4/2023 | Pilz et al. |

FOREIGN PATENT DOCUMENTS

| | | | |
|---|---|---|---|
| CA | 2697295 | | 12/2013 |
| CA | 2736834 | | 12/2015 |
| CA | 2803439 | | 3/2017 |
| CA | 3010414 | | 8/2017 |
| CA | 2 961 638 | | 9/2017 |
| CA | 2827183 | | 7/2018 |
| CA | 3036429 | | 9/2019 |
| CA | 3041494 | | 10/2019 |
| CA | 2 802 579 | | 3/2020 |
| CA | 3058865 | | 7/2020 |
| CA | 3080978 | | 11/2020 |
| DE | 60213279 | T2 | 7/2007 |
| EP | 0 335 347 | | 10/1989 |
| EP | 0 346 126 | | 12/1989 |
| EP | 3 196 376 | | 7/2017 |
| EP | 3 348 729 | | 7/2018 |
| EP | 3 556 957 | A1 | 10/2019 |
| GB | 2 159 051 | | 11/1985 |
| GB | 2411 212 | | 8/2005 |
| GB | 2 424 658 | | 10/2006 |
| JP | 06-042090 | A | 2/1994 |
| JP | 06-146433 | | 5/1994 |
| JP | 06-220934 | | 8/1994 |
| JP | 07-4620 | U | 1/1995 |
| KR | 100664665 | B1 | 1/2007 |
| WO | WO 2003/038206 | | 5/2003 |
| WO | WO 2004/071584 | | 8/2004 |
| WO | WO 2007/103331 | | 9/2007 |
| WO | WO 2009/026464 | | 2/2009 |
| WO | WO 2013/113734 | | 8/2013 |
| WO | WO 2017/129398 | | 1/2017 |
| WO | WO 2019/108295 | | 6/2019 |

OTHER PUBLICATIONS

U.S. Appl. No. 17/655,738, filed Mar. 21, 2022, Pilz.
Letter by Thomas E. Loop in Klein, *James* v. *CEMCO*, dated Nov. 4, 2011 in 10 pages.
Request for Ex Parte Reexamination of U.S. Pat. No. 10,406,389 issued Sep. 10, 2019 by Thomas E. Loop (3rd Party Requestor) and supporting documents filed Aug. 4, 2022 (64 pages).
Claim Construction Order issued Oct. 19, 2021 in *Seal3Safti, Inc.* v. *CEMCO*, USDC Case No. 2:20-cv-10409-MCS, Document No. 65, (28 pages).
Plaintiff's Brief on Bench Trial Issue No. 2 filed Jun. 3, 2022 in *Seal4Safti, Inc.* v. *CEMCO*, USDC Case No. 2:20-cv-10409-MCS, (27 pages).
Defendant's Opposition to Brief on Bench Trial Issue No. 2 filed Jun. 27, 2022 in *Seal4Safti, Inc.* v. *CEMCO*, USDC Case No. 2:20-cv-10409-MCS, (16 pages).
Claim Construction Order issued Apr. 17, 2019 in *CEMCO* v. *James A. Klein* related to U.S. Pat. Nos. 7,681,365; 7,814,718; 8,136,314, and 8,151,526; USWW Case No. C18-0659JLR, Document No. 98, (35 pages).
U.S. Appl. No. 17/303,173, filed May 21, 2021, Pilz et al.
U.S. Appl. No. 17/453,158, filed Nov. 1, 2021, Pilz.
U.S. Appl. No. 15/285,440, filed Oct. 4, 2016, Pilz.
U.S. Appl. No. 15/411,374, filed Jan. 20, 2017, Pilz.
U.S. Appl. No. 15/462,671, filed Mar. 17, 2017, Pilz.
U.S. Appl. No. 15/469,370, filed Mar. 24, 2017, Pilz et al.
U.S. Appl. No. 15/655,688, filed Jul. 20, 2017, Pilz.
U.S. Appl. No. 15/986,280, filed May 22, 2018, Pilz et al.
U.S. Appl. No. 16/001,228, filed Jun. 6, 2018, Pilz et al.
U.S. Appl. No. 16/112,118, filed Aug. 24, 2018, Pilz.
U.S. Appl. No. 16/253,653, filed Jan. 22, 2019, Pilz et al.
U.S. Appl. No. 16/598,211, filed Oct. 10, 2019, Pilz.
U.S. Appl. No. 16/791,869, filed Feb. 14, 2020, Pilz et al.
U.S. Appl. No. 16/809,401, filed Mar. 4, 2020, Pilz.
U.S. Appl. No. 16/845,535, filed Apr. 10, 2020, Pilz et al.
U.S. Appl. No. 16/871,644, filed May 11, 2020, Pilz.
U.S. Appl. No. 17/001,422, filed Aug. 24, 2020, Pilz et al.
U.S. Appl. No. 17/129,511, filed Dec. 21, 2020, Pilz.
U.S. Appl. No. 17/304,451, filed Jun. 21, 2021, Pilz et al.
U.S. Appl. No. 17/305,653, filed Jul. 12, 2021, Pilz et al.
U.S. Appl. No. 17/446,947, filed Sep. 3, 2021, Pilz.
U.S. Appl. No. 17/445,393, filed Aug. 18, 2021, Pilz.
BiazeFrame 2009 catalog of products, available at least as of Mar. 4, 2010 from www.blazeframe.com, in 20 pages.
Canadian First Office Action for Application No. 2,697,295, dated Sep. 21, 2011, in 4 pages.
Canadian Second Office Action for Application No. 2,697,295, dated May 23, 2012, in 4 pages.
Canadian Office Action for Application No. 2,827,183, dated Mar. 27, 2015 in 4 pages.
Canadian Office Action for Application No. 2,827,183, dated Mar. 7, 2016 in 4 pages.
Canadian Office Action for Applicaton No. 2,802,579, dated Jan. 3, 2019 in 3 pages.
Catalog page from Stockton Products, printed fromwww. stocktonproducts.com, on Dec. 16, 2007, showing #5 Drip, in 1 page.
ClarkDietrich Building Systems, Product Submittal Sheet, (FTSC) Flat Trail Vertical Slide Clip. CD-FTSC11 Jul. 2011. 1 page.
DoubleTrackTM information sheets by Dietrich Metal Framing, in 2 pages; accessible on Internet Wayback Machine on Jul. 8, 2006.
FireStikTM by CEMCO Brochure, published on www.firestik.US, in 18 pages; accessible on Internet Wayback Machine on Aug. 13, 2007.
Information Disclosure Statement letter; U.S. Appl. No. 12/196,115, dated Aug. 4, 2011.
International Search Report for Application No. PCT/US2008/073920, dated Apr. 9, 2009.
"Intumescent Expansion Joint Seals", Astroflame; http://www.astroflame.com/intumescent_expansion_joint_seals; Jul. 2011; 4 pages.
James A. Klein's Answer, Affirmative Defenses and Counterclaims to Third Amended Complaint; U.S. District Court, Central District of California; Case No. 2:12-cv-10791-DDP-MRWx; Filed Sep. 17, 2014; pp. 1-37.
Letter from Thomas E. Loop; counsel for defendant; Jun. 26, 2015.
Expert Report of James William Jones and exhibits; Case No. CV12-10791 DDP (MRWx); May 18, 2015.
Letter from Ann G. Schoen of Frost Brown Todd, LLC; Jun. 24, 2015.
"System No. HW-D-0607", May 6, 2010, Metacaulk, www.rectorseal.com, www.metacault.com; 2008 Underwriters Laboratories Inc.; 2 pages.
Trim-Tex, Inc., TRIM-TEX Wall Mounted Deflection Bead Installation Instructions, 2 pages. [Undated. Applicant requests that the Examiner review and consider the reference as prior art for the purpose of examination.].
"Wall Mounted Deflection Bead," Trim-Tex Drywall Products; Oct. 9, 2016; 3 pages.
Canadian Office Action re Application No. 3,052,184, dated Jul. 14, 2021.
Canadian Notice of Allowance re Application No. 3,058,865, dated Jul. 27, 2021.
Canadian Office Action re Application No. 3,080,978, dated Jun. 17, 2021.
U.S. Appl. No. 17/821,128, filed Aug. 19, 2022, Pilz et al.
U.S. Appl. No. 17/822,091, filed Aug. 24, 2022, Pilz.
U.S. Appl. No. 17/935,291, filed Sep. 26, 2022, Pilz et al.
U.S. Appl. No. 90/020,150, filed by 3rd Party Loop IP on Sep. 19, 2022 in Re U.S. Pat. No. 10,406,389 issued Sep. 10, 2019 (221 pages).

(56) References Cited

OTHER PUBLICATIONS

Redacted Complaint for (1) Breach of Contract; (2) Patent Infringement; (3) Unfair Competition, filed Jan. 9, 2018 in *California Expanded Metal Products Company et al.* v. *James A. Klein et al.*; Case No. 2:18-cv-00242 (29 pages).
Notice of Related Cases, filed Jan. 10, 2018 in *California Expanded Metal Products Company et al.* v. *James A. Klein et al.*; Case No. 2:18-cv-00242 (3 pages).
Plaintiffs CEMCO and Clarkdietrich's Motion to Strike Defendants' Affirmative Defenses and Memorandum in Support Thereof filed Jul. 9, 2018 in *California Expanded Metal Products Company et al.* v. *James A. Klein et al.*; Case No. 2:18-cv-00659-JLR (22 pages).
Plaintiffs' Opposition to Defendants' Motion for Summary Judgment, filed Aug. 6, 2018 in *California Expanded Metal Products Company et al.* v. *James A. Klein et al.*; Case No. 2:18-cv-00659-JLR (32 pages).
Order Denying Defendants' Motion for Partial Summary Judgment, issued Nov. 20, 2018 in *California Expanded Metal Products Company et al.* v. *James A. Klein et al.*; Case No. C18-0659JLR (23 pages).
Joint Claim Construction and Prehearing Statement, filed Jan. 9, 2019 in *California Expanded Metal Products Company et al.* v. *James A. Klein et al.*; Case No. 2:18-cv-00659-JLR (16 pages).
Plaintiffs' Opening Markman Brief, filed Feb. 1, 2019 in *California Expanded Metal Products Company et al.* v. *James A. Klein et al.*; Case No. 2:18-cv-00659-JLR (31 pages).
Defendants' Opening Claim Construction Brief, filed Feb. 1, 2019 in in *California Expanded Metal Products Company et al.* v. *James A. Klein et al.*; Case No. 2:18-cv-00659-JLR (23 pages).
Plaintiffs' Responsive Claim Construction Brief, filed Feb. 15, 2019 in *California Expanded Metal Products Company et al.* v. *James A. Klein et al.*; Case No. 2:18-cv-00659-JLR (21 pages).
Defendants' Responding Claim Construction Brief, filed Feb. 15, 2019 in *California Expanded Metal Products Company et al.* v. *James A. Klein et al.*; Case No. 2:18-cv-00659-JLR (21 pages).
Claim Construction Order, issued Apr. 17, 2019 in *California Expanded Metal Products Company et al.* v. *James A. Klein et al.*; Case No. C18-0659JLR (35 pages).
Plaintiffs' Motion for Partial Summary Judgment and Memorandum in Support Thereof, filed May 10, 2019 in in *California Expanded Metal Products Company et al.* v. *James A. Klein et al.*; Case No. 2:18-cv-00659-JLR (29 pages).
Amended Order on Cross-Motions for Summary Judgment, issued Nov. 22, 2019 in *California Expanded Metal Products Company et al.* v. *James A. Klein et al.*; Case No. C18-0659JLR (44 pages).
Plaintiffs' Trial Brief, filed Dec. 2, 2019 in *California Expanded Metal Products Company et al.* v. *James A. Klein et al.*; Case No. 2:18-cv-00659-JLR (40 pages).
Complaint for Declaratory Judgment of Patent Noninfringement, Patent Unenforceability, and Patent Invalidity, filed Nov. 13, 2020 in *Seal4Safti* v. *California Expanded Metal Products Co.*; Case No. 2:20-cv-10409 (83 pages).
Defendant's Answer to Plaintiff's Complaint for Declaratory Judgment of Patent Noninfringement, Patent Unenforceability, and Patent infringement; Affirmative Defenses, and Counterclaims for Patent Infringement, filed Feb. 22, 2021 in *Seal4Safti* v. *California Expanded Metal Products Co.*; Case No. 2:20-cv-10409-MCS-JEM (21 pages).
Defendant's First Amended Answer to Plaintiff's Complaint for Declaratory Judgment of Patent Noninfringement, Patent Unenforceability, and Patent Infringement; Affirmative Defenses, and Counterclaims for Patent Infringement, filed Jul. 19, 2021 in *Seal4Safti* v. *California Expanded Metal Products Co.*; Case No. 2:20-cv-10409-MCS-JEM (22 pages).
Answer to Amended Counterclaims for Patent Infringement, filed Aug. 9, 2021 in *Seal4Safti* v. *California Expanded Metal Products Co.*; Case No. 2:20-cv-10409-MCS-JEM (20 pages).
Answer to Amended Counterclaims for Patent Infringement, filed Aug. 10, 2021 in *Seal4Safti* v. *California Expanded Metal Products Co.*; Case No. 2:20-cv-10409-MCS-JEM (20 pages).
Joint Claim Construction Prehearing Statement, filed Aug. 13, 2021 in *Seal4Safti* v. *California Expanded Metal Products Co.*; Case No. 2:20-cv-10409-MCS-JEM (9 pages).
Plaintiff's Opening Markman Brief, filed Sep. 13, 2021 in *Seal4Safti* v. *California Expanded Metal Products Co.*; Case No. 2:20-cv-10409-MCS-JEM (31 pages).
Defendant CEMCO's Opening Markman Brief, filed Sep. 13, 2021 in *Seal4Safti* v. *California Expanded Metal Products Co.*; Case No. 2:20-cv-10409-MCS-JEM (32 pages).
Plaintiff Seal4Safti, Inc.'s Responsive Markman Brief, filed Oct. 4, 2021 in *Seal4Safti* v. *California Expanded Metal Products Co.*; Case No. 2:20-cv-10409-MCS-JEM (25 pages).
Order Regarding Claim Construction [55, 56], filed Oct. 19, 2021 in *Seal4Safti* v. *California Expanded Metal Products Co.*; Case No. 2:20-cv-10409-MCS-JEM (28 pages).
Statement of Uncontroverted Facts and Conclusions of Law in Support of Plaintiff's Motion for Summary Judgment, filed Dec. 20, 2021 in *Seal4Safti* v. *California Expanded Metal Products Co.*; Case No. 2:20-cv-10409-MCS-JEM (21 pages).
Redacted Statement of Uncontroverted Facts in Support of Motion for Summary Judgment on Plaintiff's Second Claim of Patent Unenforceability and Third Claim of Patent Invalidity, filed Dec. 20, 2021 in *Seal4Safti* v. *California Expanded Metal Products Co.*; Case No. 2:20-cv-10409-MCS-JEM (36 pages).
Reply Memorandum of Points and Authorities in Support of Plaintiff's Motion for Summary Judgement [Dkt. 74], filed Jan. 10, 2022 in *Seal4Safti* v. *California Expanded Metal Products Co.*; Case No. 2:20-cv-10409-MCS-JEM (15 pages).
Order regarding Plaintiff's Motion for Summary Judgment [74] and Defendant's Motion for Summary Judgment [79], filed Jan. 19, 2022 in *Seal4Safti* v. *California Expanded Metal Products Co.*; Case No. 2:20-cv-10409-MCS (JEMx) (25pages).
Defendant CEMCO's Redacted Trial Brief Pursuant to L.R. 16-10, filed Apr. 26, 2022 in *Seal4Safti* v. *California Expanded Metal Products Co.*; Case No. 2:20-cv-10409-MCS-JEM (26 pages).
Defendant CEMCO's Bench Trial Motion for Enhanced Damages and Attorney Fees, filed Jun. 3, 2022 in *Seal4Safti* v. *California Expanded Metal Products Co.*; Case No. 2:20-cv-10409-MCS-JEM (31 pages).
Defendant CEMCO's Bench Trial Motion for Permanent Injunction, filed Jun. 3, 2022 in *Seal4Safti* v. *California Expanded Metal Products Co.*; Case No. 2:20-cv-10409-MCS-JEM (30 pages).
Defendant CEMCO's Opposition to Plaintiff Seal4Safti, Inc.'s Brief on Bench Trial Issue No. 2: Inequitable Conduct, filed Jun. 13, 2022 in *Seal4Safti* v. *California Expanded Metal Products Co.*; Case No. 2:20-cv-10409-MCS-JEM (16 pages).
First Amended Complaint for: 1) Tortious Interference with Contractual Relations; 2) Tortious Interference with Prospective Economic Advantage; 3) Negligent Interference with Prospective Economic Advantage; 4) Inducing Breach of Contract; 5) Breach of Contract; 6) Breach of Covenant of Good Faith and Fair Dealing, filed Dec. 21, 2012 in *California Expanded Metal Products Co.* v. *Clarkwestern Dietrich Building Systems LLC et al.*; Case No. CV12-10791 VBK (17 pages).
Complaint for: 1) Tortious Interference with Contractual Relations; 2) Tortious Interference with Prospective Economic Advantage; 3) Negligent Interference with Prospective Economic Advantage; 4) Inducing Breach of Contract; 5) Breach of Contract; 6) Breach of Covenant of Good Faith and Fair Dealing, filed Dec. 18, 2012 in *California Expanded Metal Products Co.* v. *Clarkwestern Dietrich Building Systems LLC et al.*; Case No. CV12-10791 VBK (20 pages).
Second Amended Complaint for: 1) Tortious Interference with Contractual Relations; 2) Tortious Interference with Prospective Economic Advantage; 3) Negligent Interference with Prospective Economic Advantage; 4) Inducing Breach of Contract; 5) Breach of Contract; 6) Breach of Covenant of Good Faith and Fair Dealing, filed May 1, 2014 in *California Expanded Metal Products Co.* v. *Clarkwestern Dietrich Building Systems LLC et al.*; Case No. CV12-10791 VBK (31 pages).
California Expanded Metal Products Co.'s Answer and Affirmative Defenses to James A. Klein's Counterclaims, filed Jun. 10, 2014 in

(56) References Cited

OTHER PUBLICATIONS

*California Expanded Metal Products Co.* v. *Clarkwestern Dietrich Building Systems LLC et al.*; Case No. CV12-10791 DDP-MRWx (15 pages).

Blazeframe Industries, LTD.'s Answer, Affirmative Defenses, and Counterclaims to Third Amended Complaint, filed Sep. 19, 2014 in *California Expanded Metal Products Co.* v. *Clarkwestern Dietrich Building Systems LLC et al.*; Case No. CV12-10791 DDP-MRWx (46 pages).

California Expanded Metal Products Co.'s Answer and Affirmative Defenses to James A. Klein's Counterclaims, filed Oct. 1, 2014 in *California Expanded Metal Products Co.* v. *Clarkwestern Dietrich Building Systems LLC et al.*; Case No. CV12-10791-DDP-MRWx (18 pages).

California Expanded Metal Products Co.'s Answer and Affirmative Defenses to Blazeframe Industries, LTD.'s Counterclaims, filed Oct. 3, 2014 in *California Expanded Metal Products Co.* v. *Clarkwestern Dietrich Building Systems LLC et al.*; Case No. CV12-10791-DDP-MRWx (17 pages).

Plaintiff's Opposition to Defendant Clarkwestern Dietrich Building Systems LLC's Motion for Summary Judgment, filed Jun. 15, 2015 in *California Expanded Metal Products Co.* v. *Clarkwestern Dietrich Building Systems LLC et al.*; Case No. CV12-10791 DDP (MRWx) (30 pages).

Plaintiff CEMCO's Opposition to Defendant Blazeframe's Motion for Partial Summary Judgment of Patent Infringement, filed Aug. 7, 2015 in *California Expanded Metal Products Co.* v. *Clarkwestern Dietrich Building Systems LLC et al.*; Case No. CV12-10791 DDP (MRWx) (31 pages).

Defendant Blazeframe's Memorandum of Points and Authorities in Opposition to CEMCO's Motion for Summary Judgment of Patent Non-Infringement and Invalidity, filed Aug. 8, 2015 in *California Expanded Metal Products Co.* v. *Clarkwestern Dietrich Building Systems LLC et al.*; Case No. CV12-10791-DDP-MRWx (26 pages).

Order Denying Plaintiff's Motion for Summary Judgment re: Ownership and Granting Defendant Clarkwestern's Motion for Summary Judgment in Part and Denying in Part, filed Oct. 2, 2015 in *California Expanded Metal Products Co.* v. *Clarkwestern Dietrich Building Systems LLC et al.*; Case No. CV12-10791 DDP (MRWx) (15 pages).

U.S. Response to Office Action dated Dec. 28, 2022, filed on Feb. 27, 2023 in Reexamination U.S. Appl. No. 90/020,150.

U.S. Office Action dated May 11, 2023 in Reexamination U.S. Appl. No. 90/020,150.

U.S. Response to Office Action dated May 11, 2023, filed on Jul. 11, 2023 in Reexamination U.S. Appl. No. 90/020,150.

U.S. Office Action dated Aug. 10, 2023 in Reexamination U.S. Appl. No. 90/020,150.

* cited by examiner

WALL GAP FIRE BLOCK DEVICE, SYSTEM AND METHOD

RELATED APPLICATIONS

Any and all applications for which a foreign or domestic priority claim is identified in the Application Data Sheet as filed with the present application are hereby incorporated by reference herein and made a part of the present disclosure.

BACKGROUND OF THE INVENTION

Field of the Invention

The present invention relates to fire-resistant arrangements for building structures. In particular, disclosed arrangements are wall gap fire resistant structures or "fire blocks" that reduce or prevent fire, air, smoke and heat from passing from one side of a wall to the other side through a wall gap.

Description of the Related Art

Conventional head-of-wall fire blocks are typically labor-intensive to install. As a result, most conventional fire blocks are expensive. One example of a conventional fire block arrangement involves a fire resistant material, such as mineral wool, stuffed into gaps at the head-of-wall. Once the gaps are filled with the fire block material, a flexible coating, such as a spray-on elastomeric coating, covers the entire head-of-wall to secure the fire block material in place. As noted, such an arrangement requires a significant amount of time to install. In addition, over a period of time, the flexible coating may degrade, resulting in cracks and/or flaking. As a result, it is possible that the fire resistant material may become dislodged from the head-of-wall gaps thereby reducing the effectiveness of the fire block.

The assignee of the present application has developed more advanced head-of-wall fire block arrangements, sold under the trademark FAS TRACK®. The FAS TRACK® fire block header track utilizes an expandable fire-resistant material, such as an intumescent material, applied along a length of the header track of a wall assembly. The intumescent material wraps around a corner of the header track, extending both along a portion of a web of the header track and a flange of the header track. The intumescent advantageously is held in place between the web of the header track and the floor or ceiling above the wall. When exposed to a sufficient temperature, the intumescent material expands to fill gaps at the head-of-wall. The portion of the intumescent trapped between the header track and the floor or ceiling ensures that the intumescent stays in place as it expands and does not become dislodged as a result of the expansion. U.S. patent application Ser. Nos. 12/013,361; 12/196,115; 12/040,658; 12/039,685; and Ser. No. 12/325,943, assigned to the Assignee of the present application, describe construction products incorporating intumescent materials and are incorporated by reference herein in their entireties.

SUMMARY OF THE INVENTION

Although the FAS TRACK® fire block header track provides exceptional performance, there still exists a need for fire block arrangements that can be applied to any desired structure, such as the top of a wood stud wall assembly or to header tracks that are not FAS TRACK® fire block header tracks. Furthermore, as described herein, preferred embodiments of the wall gap fire blocks can be applied to a wall bottom track to protect a foot-of-wall gap or a (vertical or horizontal) gap in a location other than the head or foot of a wall. In addition, the intumescent material in a FAS TRACK® fire block header track preferably is applied at the factory during the manufacturing process. In some circumstances, it may be desirable to apply the intumescent material on site. Thus, certain preferred embodiments of the present fire blocks are well-suited to application on the job site.

Preferred embodiments of the present invention provide an adhesive fire resistant material strip that can be applied to a header track or other head-of-wall structure to create a head-of-wall fire block. The adhesive fire block strip may include an intumescent strip portion, among other material portions, if desired. In one arrangement, a foam strip portion is positioned adjacent to the intumescent strip portion and a clear poly tape layer covers both the intumescent strip portion and the foam strip portion. Preferably, the poly tape layer is wider than the combined width of the intumescent strip portion and the foam strip portion such that side portions of the poly tape layer can include an adhesive and be used to secure the fire block strip to a header track or other head-of-wall structure. The underneath surface of the intumescent strip portion and the foam strip portion may also include an adhesive, if desired. Preferably, a removable protective layer covers the underneath surface of the entire fire block strip until the fire block strip is ready to be applied.

The fire block strip can be applied to a header track or other construction product, such as a bottom track, metal stud, metal flat strap or any other framing member that needs an open gap between the wallboard and a perimeter structure for movement (deflection or drift). The fire block strip allows the gap to stay open for movement and provides fire and smoke protection and sound reduction. Preferably, the fire block strip is applied such that it wraps the upper corner of the header track or other head-of-wall structure. The foam strip portion may be positioned on the top of the header track or other head-of-wall structure to provide a smoke, air and sound seal at the head-of-wall. The intumescent strip portion may be positioned on a side flange of the header track or side surface of the other head-of-wall structure such that the intumescent strip portion is positioned between the header track or other head-of-wall structure and the wallboard. The poly tape layer secures the foam strip portion and the intumescent strip portion to the header track or other head-of-wall structure and provides protection in the event that the wall is designed to accommodate vertical movement, which could result in the wallboard rubbing against the fire block strip. However, the poly tape layer still permits the intumescent strip portion to expand when exposed to a sufficient temperature.

A preferred embodiment involves a wall assembly including a header track, a bottom track, a plurality of vertical wall studs extending in a vertical direction between the bottom track and the header track, and at least a first wallboard member and a second wallboard member supported by the plurality of wall studs. The first wallboard member has a first vertical side edge and the second wallboard member has a second vertical side edge. The first vertical side edge and the second vertical side edge face one another to define a vertically-extending deflection gap between the first wallboard member and the second wallboard member. The wall assembly also includes a fire-block wall component having a vertical fire-block support and a fire-resistant material strip. The fire-block support is positioned at the deflection gap and the fire-resistant material strip is attached to the fire-block support. The fire-resistant material strip faces an interior surface of the first wallboard member and the second wallboard member and extends lengthwise along and across the deflection gap. The fire-resistant material strip includes an intumescent material that expands when exposed to elevated heat to seal the deflection gap.

Another preferred embodiment involves a wall assembly including a first wall portion having a first wallboard member having a first wallboard surface and a first edge and a second wall portion having a second wallboard member having a second wallboard surface and a second edge. The first edge and the second edge face one another and define a deflection gap therebetween. The wall assembly further includes a fire-block wall component including at least a first layer and a fire-resistant material strip attached to the first layer. The fire-resistant material strip includes an intumescent material that expands in response to sufficient heat to create a fire-resistant barrier. The fire-block wall component is positioned to extend lengthwise along and across the deflection gap between the first wallboard member and the second wallboard member. The fire-block wall component has a U-shaped central portion and a pair of side portions extending in opposite directions from the central portion. The central portion is located between the first edge and the second edge, and the pair of side portions are positioned on the first wallboard surface and the second wallboard surface, respectively, adjacent the deflection gap. The fire-resistant material strip is located on the central portion of the fire-block wall component such that the intumescent material seals the deflection gap when expanded.

Yet another preferred embodiment involves a wall assembly including a first wall portion having a first wallboard member having a first wallboard surface and a first edge and a second wall portion having a second wallboard member having a second wallboard surface and a second edge. The first edge and the second edge face one another and define a deflection gap therebetween. The wall assembly further includes a fire-block wall component including at least a first layer and a fire-resistant material strip attached to the first layer. The fire-resistant material strip includes an intumescent material that expands in response to sufficient heat to create a fire-resistant barrier. The fire-block wall component is positioned to extend lengthwise along and across the deflection gap between the first wallboard member and the second wallboard member. The fire-block wall component has a V-shaped central portion and a pair of side portions extending in opposite directions from the central portion. The central portion is located between the first edge and the second edge, and the pair of side portions are positioned on the first wallboard surface and the second wallboard surface, respectively, adjacent the deflection gap. The fire-resistant material strip is located on the central portion of the fire-block wall component such that the intumescent material seals the deflection gap when expanded.

Other preferred embodiments involve methods of manufacturing the fire block strip and/or a header, footer or stud with a fire block strip. Preferred embodiments also involve methods of assembling a wall including a header, footer or stud incorporating a fire block strip.

BRIEF DESCRIPTION OF THE DRAWINGS

The above-described and other features, aspects and advantages of the present invention are described below with reference to drawings of preferred embodiments, which are intended to illustrate, but not to limit, the invention. The drawings contain eleven figures.

DETAILED DESCRIPTION

Figure 1A:
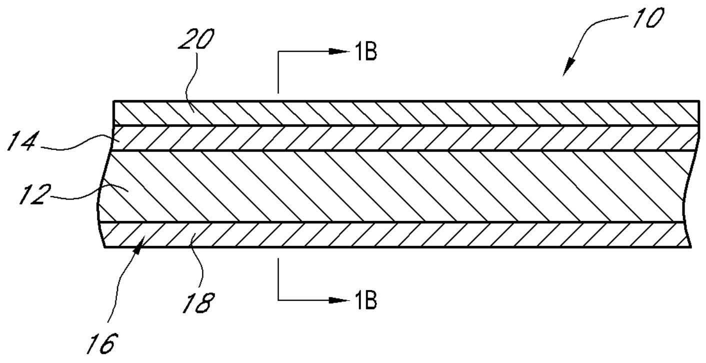
FIG. 1A is a top view of a portion of a fire block strip assembly having certain features, aspects and advantages of the present invention.
Figure 1B:
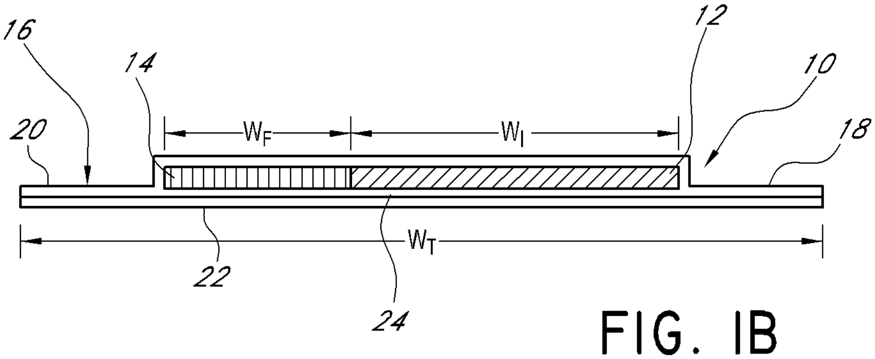
FIG. 1B is a cross-sectional view of the fire block strip assembly of FIG. 1A. The cross-section view of FIG. 1B is taken along line 1B-1B of FIG. 1A.

FIGS. 1*a* and 1*b* illustrate a fire block strip assembly 10, which is also referred to herein as a fire block strip or, simply, a strip. The fire block strip 10 is an elongate strip assembly that preferably is constructed as an integrated assembly of multiple components. The fire block strip 10 may be supplied on a roll, in a folded arrangement or any other suitable manner. Preferably, the fire block strip 10 is provided as a separate component that is applied to a head-of-wall in the field, as is described in greater detail below. Alternatively, the fire block strip 10 may be pre-assembled to a header track during manufacture.

The illustrated fire block strip 10 includes a fire-resistant material strip portion 12 ("fire-resistant material strip 12") and a foam strip portion 14 ("foam strip 14"). The fire-resistant material strip 12 and the foam strip 14 are positioned side-by-side and co-planar with one another. A cover layer 16 covers both the fire-resistant material strip 12 and the foam strip 14. Preferably, the cover layer 16 also includes side portions 18 and 20 that extend outwardly from the fire-resistant material strip 12 and the foam strip 14, respectively. Alternatively, the cover layer 16 may cover only the fire-resistant material strip 12 and foam strip 14 and the side portions 18 and 20 may be omitted. In such an arrangement, the strip 10 may be secured to a construction product by an adhesive applied to the bottom of the fire-resistant material strip 12 and the foam strip 14.

The fire-resistant material strip 12 may be constructed partially or entirely from an intumescent material, such as BlazeSeal™ from Rectorseal of Houston, Tex. Other suitable intumescent materials are available from Hilti Corporation, Specified Technologies, Inc., or Grace Construction Products. The intumescent material expands to many times its original size when exposed to sufficient heat. Thus, intumescent materials are used as a fire block because the expanding material tends to fill gaps. Once expanded, the intumescent material is resistant to smoke, heat and fire and inhibits fire from passing through the head-of-wall. The fire-resistant material strip 12 may be referred to as an intumescent strip 12 herein. It is understood that the term intumescent strip 12 is used for convenience and that the term is to be interpreted to cover other expandable fire-resistant materials as well, unless otherwise indicated.

The foam strip 14 is preferably made from a suitable foam or foam-like material that is an open or closed cell structure and is compressible. Suitable materials may include polyester and polyether, among others. The foam strip 14 preferably forms a seal between the top of the wall on which the fire block strip 10 is applied and the floor or ceiling (or other horizontal support structure) above the wall.

Preferably, a removable protective layer 22 covers the underneath surface of the fire block strip 10. An optional adhesive layer 24 may be included underneath the intumescent strip 12 and the foam strip 14 and covered by the protective layer 22. In addition, preferably, the cover layer 16 includes an adhesive layer (not shown) on the underneath side that faces the intumescent strip 12, foam strip 14 and protective layer 22. Thus, in some arrangements, the cover layer 16 is a tape, such as a polypropylene tape, also referred to herein as poly tape. Other suitable tapes may also be used. The cover layer 16 may be clear or somewhat clear such that the intumescent strip 12 and foam strip 14 are visible through the cover layer 16 to ease assembly onto a header track or other head-of-wall structure. In addition or in the alternative, a marking (such as a mark line) may be provided on the outer (upper) surface of the cover layer 16 to indicate the location of the junction between the intumescent strip 12 and foam strip 14. The marking or junction can be used to locate the intumescent strip 12 and foam strip 14 relative to the structure on which it is placed, such as the corner of a top or bottom track, for example.

The fire block strip 10 has an overall width $W_T$ from an outside edge of the side portion 18 to an outside edge of the side portion 20. The width $W_T$ may vary depending on the desired application and/or desired deflection requirement of the fire block strip 10. Preferably, the width $W_T$ is between about three (3) inches and about six (6) inches. In one arrangement, the width $W_T$ is about four (4) inches. The intumescent strip has a width $W_1$ and the foam strip has a width $W_F$. The combined width of the intumescent strip width $W_1$ and the foam strip width $W_F$ is less than the total width $W_T$ by an amount that provides a sufficient width to each of the side portions 18, 20 such that the side portions 18, 20 are capable of securely affixing the fire block strip 10 to a desired structure, such as a header track or other wall structure. In some arrangements, the width $W_1$ of the intumescent strip 12 may be greater than the width $W_F$ of the foam strip 14. For example, the width $W_1$ of the intumescent strip 12 may be about one and one-half to about two times the width $W_F$ of the foam strip 14. However, in other arrangements, the intumescent strip 12 may be about the same width as the foam strip 14, or the foam strip 14 may be wider than the intumescent strip 12. The width $W_1$ of the intumescent strip 12 may be determined by the size of any head-of-wall gap (or other wall gap) to be filled and/or by the degree of vertical (or other) movement permitted by the wall structure. The width $W_F$ of the foam strip 14 may be determined by the width of the wall structure and/or by the amount of sealing desired.

Figure 2:
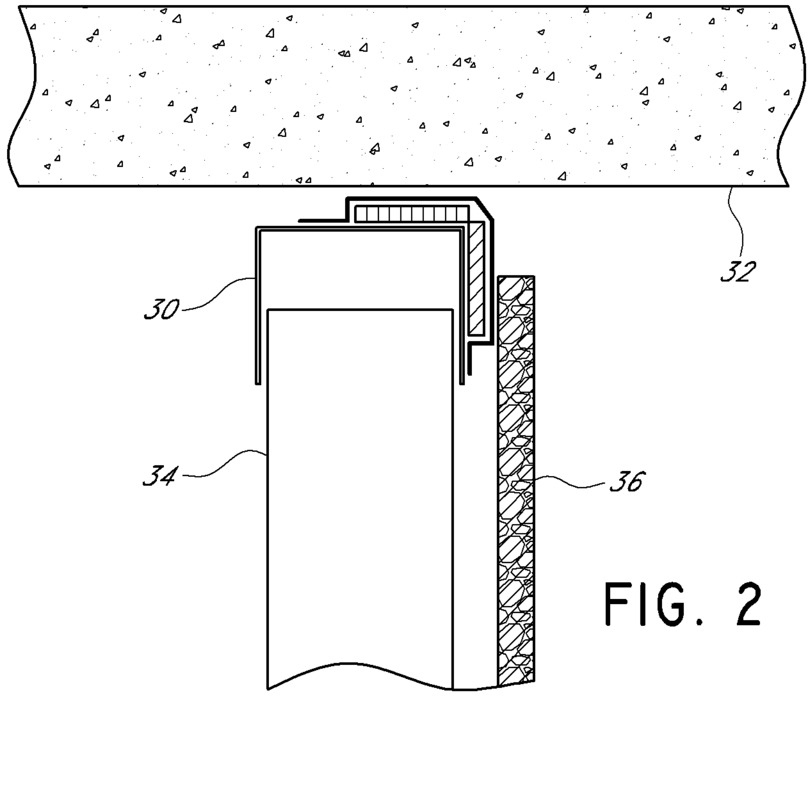
FIG. 2 is a view of a stud wall assembly with the fire block strip assembly of FIG. 1A installed at the head-of-wall.
Figure 2A:
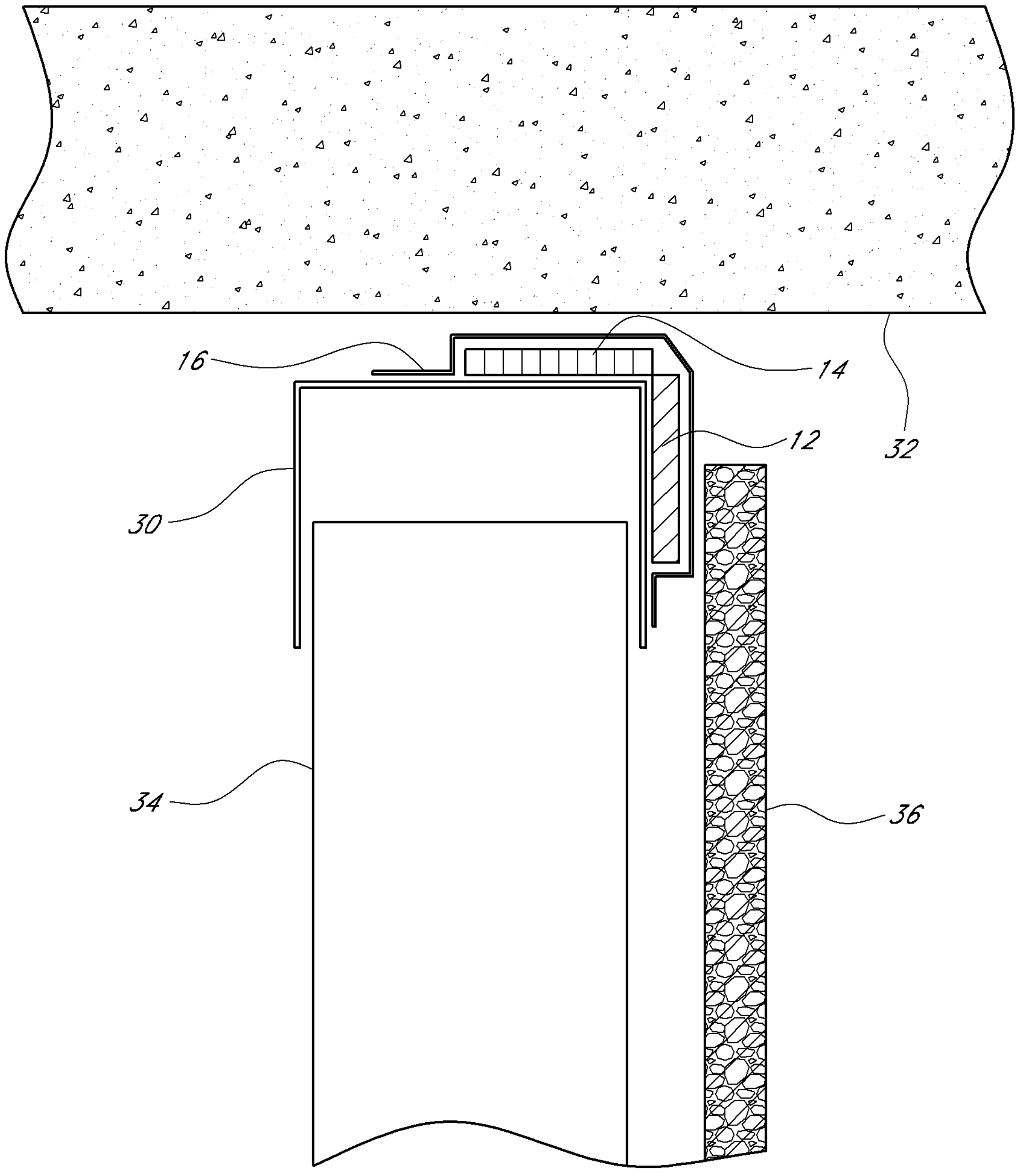
FIG. 2A is a view of a portion of the wall assembly of FIG. 2 identified by the circle 2A in FIG. 2.

FIGS. 2 and 2*a* illustrate the fire block strip 10 applied to a head-of-wall structure, in particular to a header track 30. The header track 30 is a U-shaped channel that is attached to an upper horizontal support structure 32, such as a floor of an upper floor or a ceiling. Wall studs 34 are received in the header track 30 and may be configured for vertical movement relative to the header track 30, as is known in the art. A wallboard 36 is attached to the studs 34, such as by a plurality of suitable fasteners. Although not shown, a footer track receives the lower end of the studs 34, as is known in the art. The fire block strip 10 is attached to the header track 30 such that a portion of the fire block strip 10 is positioned between the header track 30 and the horizontal support structure 32 and another portion of the fire block strip 10 is positioned between the header track 30 and the wallboard 36.

With reference to FIG. 2*a*, preferably, the foam strip 14 is positioned between the header track 30 and the horizontal support structure 32 and the intumescent strip 12 is positioned on the flange portion of the header track 30 between the header track 30 and the wallboard 36. Preferably, the transition or junction between the intumescent strip 12 and the foam strip 14 is aligned with the corner between the web and flange portions of the header track 30. The cover layer 16 secures the fire block strip 10 to the header track 30. In addition, if an adhesive layer 24 is provided, the adhesive layer 24 may assist in securing the fire block strip 10 to the header track 30. Although a fire block strip 10 is shown on only one side of the header track 30, a second fire block strip 10 may be positioned on the opposite side of the header track 30.

When exposed to a sufficient temperature, the intumescent strip 12 will expand to fill gaps between the header track 30 and the horizontal support structure 32. The cover layer 16 may degrade in response to the exposure to an elevated temperature or in response to pressure exerted by the expansion of the intumescent strip 12, but in any event preferably will assist in maintaining the intumescent strip 12 in place until the expansion of the intumescent strip 12 is sufficient to hold the intumescent strip 12 in place. In addition, or in the alternative, the adhesive layer 24 may assist in keeping the intumescent strip 12 in place.

Figure 3:
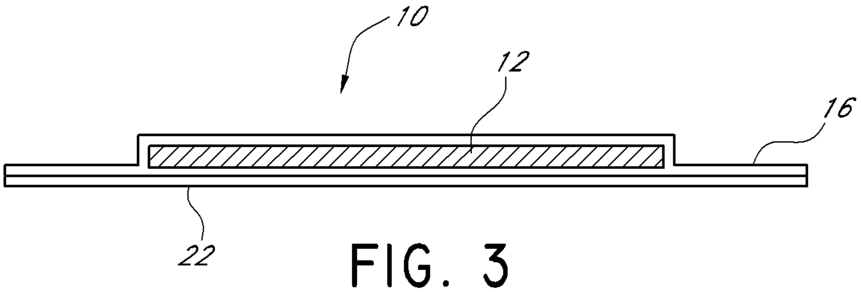
FIG. 3 is a cross-sectional view of another fire block strip assembly.
Figure 4:
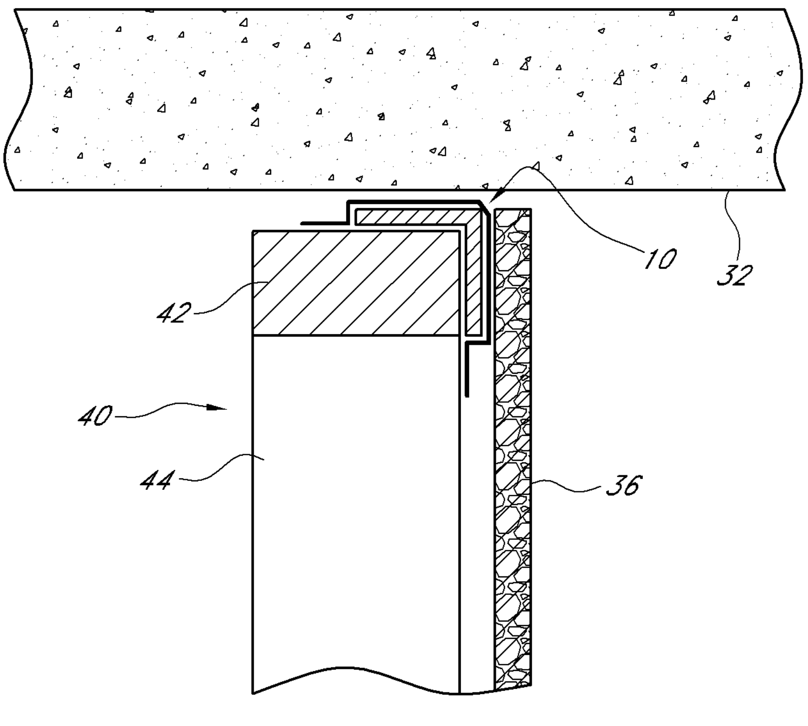
FIG. 4 is a view of a portion of a wood stud wall assembly with the fire block strip assembly of FIG. 3 installed at the head-of-wall.

FIGS. 3 and 4 illustrate another embodiment of a fire block strip 10, which is similar to the fire block strip 10 of FIGS. 1 and 2. Accordingly, the same reference numbers are used to indicate the same or similar components or features between the two embodiments. The fire block strip 10 of FIGS. 3 and 4 includes an intumescent strip 12, but omits the foam strip. A cover layer 16 covers the intumescent strip 12 and also extends to each side. An adhesive layer (not shown) may be located on the underneath surface of the intumescent strip 12, similar to the adhesive layer 24 of the fire block strip 10 of FIGS. 1 and 2. In addition, the cover layer 16 may include an adhesive layer (not shown) as described above in connection with the embodiment of FIGS. 1 and 2. A removable protective layer 22 covers the underneath surface of the intumescent layer 12 and the side portions of the cover layer 16.

FIG. 4 illustrates the fire block strip 10 applied to a head-of-wall structure, in particular a wood stud wall 40 including a header 42 and a plurality of studs 44. The fire block strip 10 is applied in a manner similar to the fire block strip 10 of FIGS. 1 and 2 with a portion of the fire block strip 10 between the header 42 and the horizontal support structure 32 and a portion between the header 42, and possibly the studs 44, and the wallboard 36. The intumescent strip 12 wraps the corner of the header 42. As discussed above, the fire block strip 10 may include a marking to assist in the proper positioning on the corner of the header 42, such as a linear marking, for example. In addition or in the alternative, the intumescent strip 12 may be divided into two portions such that one portion can be positioned on top of the header 42 and the other portion can be positioned on the side of the header 42.

Figure 5:
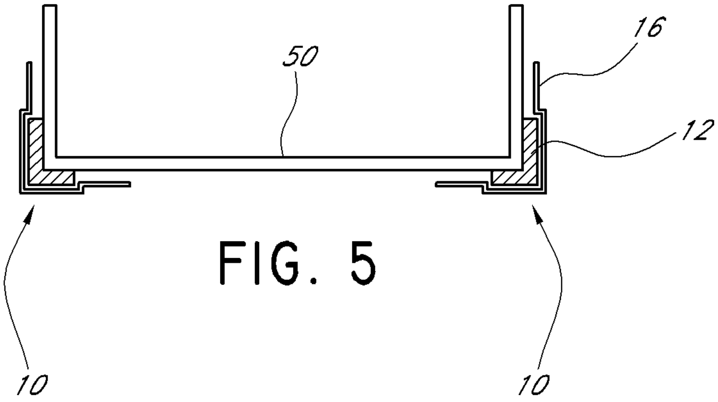
FIG. 5 is cross-sectional view of a fire block strip assembly applied to a bottom track.
Figure 6:
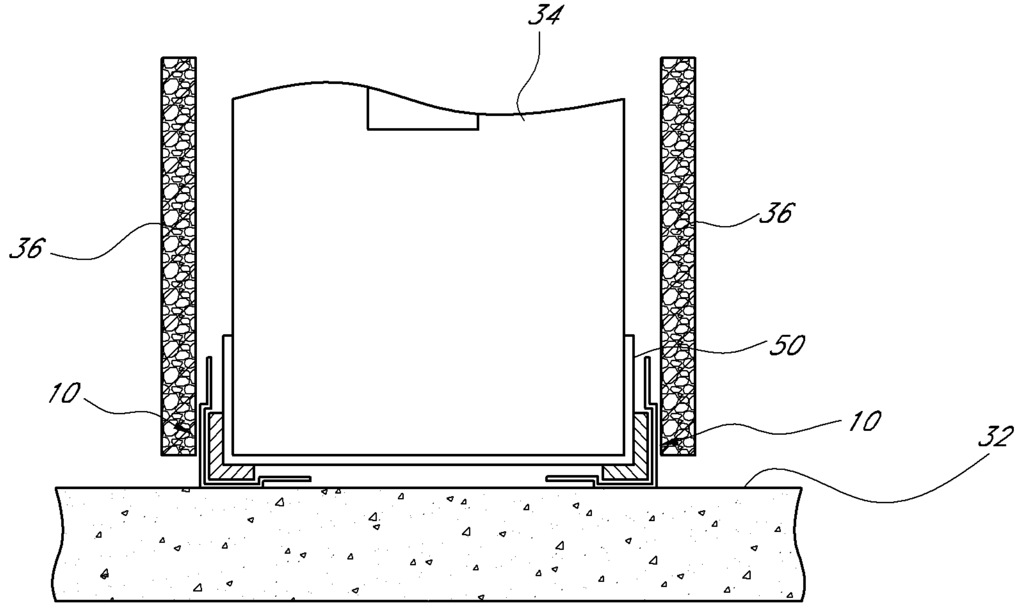
FIG. 6 is a cross-sectional view of the bottom track of FIG. 5 installed at a foot-of-wall.

FIGS. 5 and 6 illustrate another application of a fire block strip 10, which is similar to the fire block strips 10 of FIGS. 1-4, applied to corners of a bottom track 50. With reference to FIG. 5, the fire block strip 10 includes an intumescent strip 12, but omits the foam strip. However, a foam strip could be included if desired and preferably would be positioned underneath the bottom track 50. Similar to the prior embodiments, a cover layer 16 covers the intumescent strip 12 and also extends to each side. An adhesive layer (not shown) may be located on the underneath surface of the intumescent strip 12, similar to the adhesive layer 24 of the fire block strip 10 of FIGS. 1 and 2. In addition, the cover layer 16 may include an adhesive layer (not shown) as described above in connection with the embodiment of FIGS. 1 and 2. A removable protective layer may be provided to cover the underneath surface of the intumescent layer 12 and the side portions of the cover layer 16. In the illustrated arrangement, a fire block strip 10 is applied at each corner of the bottom track 50.

With reference to FIG. 6, the bottom track 50 is illustrated as a component in a wall assembly. The wall assembly rests on a horizontal support structure 32, such as a concrete floor. A plurality of studs 34 (one shown) are received within the bottom track 50 and preferably are secured to the bottom track with suitable fasteners (not shown). Wallboards 36 are attached on opposing sides of the studs 34, such as by a plurality of suitable fasteners (not shown). In an embodiment that includes a foam strip, preferably, the foam strip is located between the bottom track 50 and the floor 32. In the event of a fire, the fire block strips 10 expand to seal the gap between the wallboard 36 and floor 32 and between the bottom track 50 and floor 32.

Figure 8:
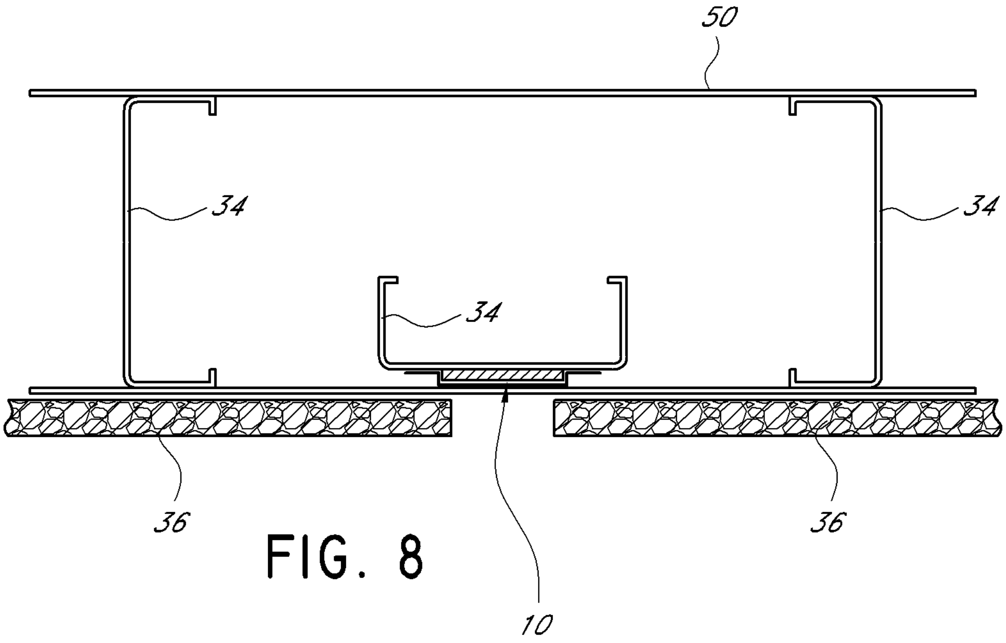
FIG. 8 is a cross-sectional view of the stud of FIG. 7 installed in a wall assembly at a vertical wall gap.
Figure 7:
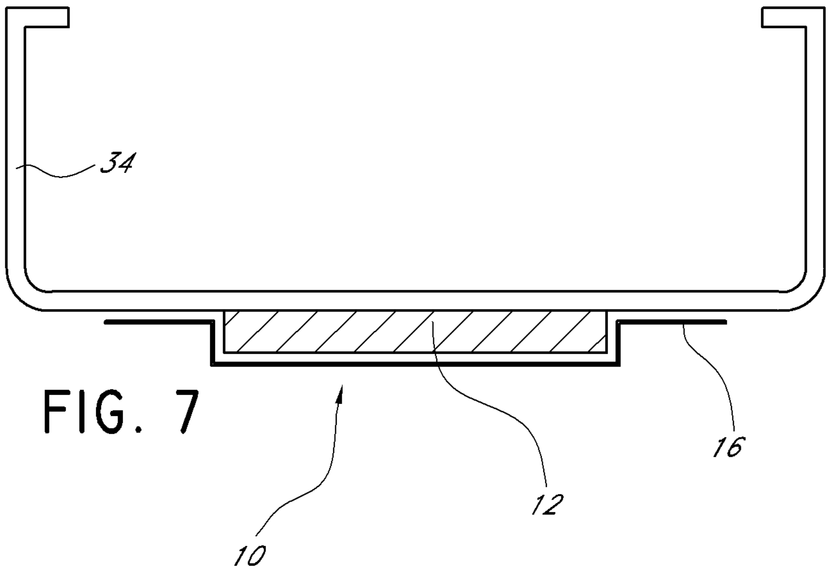
FIG. 7 is a cross-sectional view of a fire block strip assembly applied to a stud.

FIGS. 7 and 8 illustrate yet another application of the fire block strip 10, in which the strip 10 is applied to a wall stud 34. The strip 10, itself, may be similar to the strip 10 of FIGS. 1 and 2 (including a foam strip 14) or it may be similar to the strip 10 of FIGS. 3 and 4 (omitting the foam strip 14). The strip 10 is applied to a wall stud 34 to provide a fire block at a gap that is not at the head-of-wall or foot-of-wall. In the illustrated arrangement, the strip 10 is applied to an outer surface of the web of the C-shaped wall stud 34. Preferably, the strip 10 is applied lengthwise along a center portion of the web of the wall stud 34. However, in other arrangements, the strip 10 can be applied to other portions of the stud 34 so that the strip 10 generally aligns with a gap present between pieces of wallboard 36. For example, the strip 10 could be placed on the corner of the stud 34 or on a side wall of the stud 34.

With reference to FIG. 8, the wall stud 34 with the fire block strip 10 applied thereto is assembled into a wall assembly. As is known in the art, a plurality of studs 34 extend in a vertical direction from a bottom track 50. The studs 34 support pieces of wallboard 36. The stud 34 with the fire block strip 10 is positioned at a gap between wallboard 36 pieces, with the outer surface of the web facing the wallboard 36 and positioned adjacent to the wallboard 36. The stud 34 with the fire block strip 10 may be secured to the bottom track 50 and header track (not shown) by suitable fasteners, such as screws. In the event of a fire, the fire block strip 10 expands to seal the gap between the pieces of wallboard 36.

Figure 9:
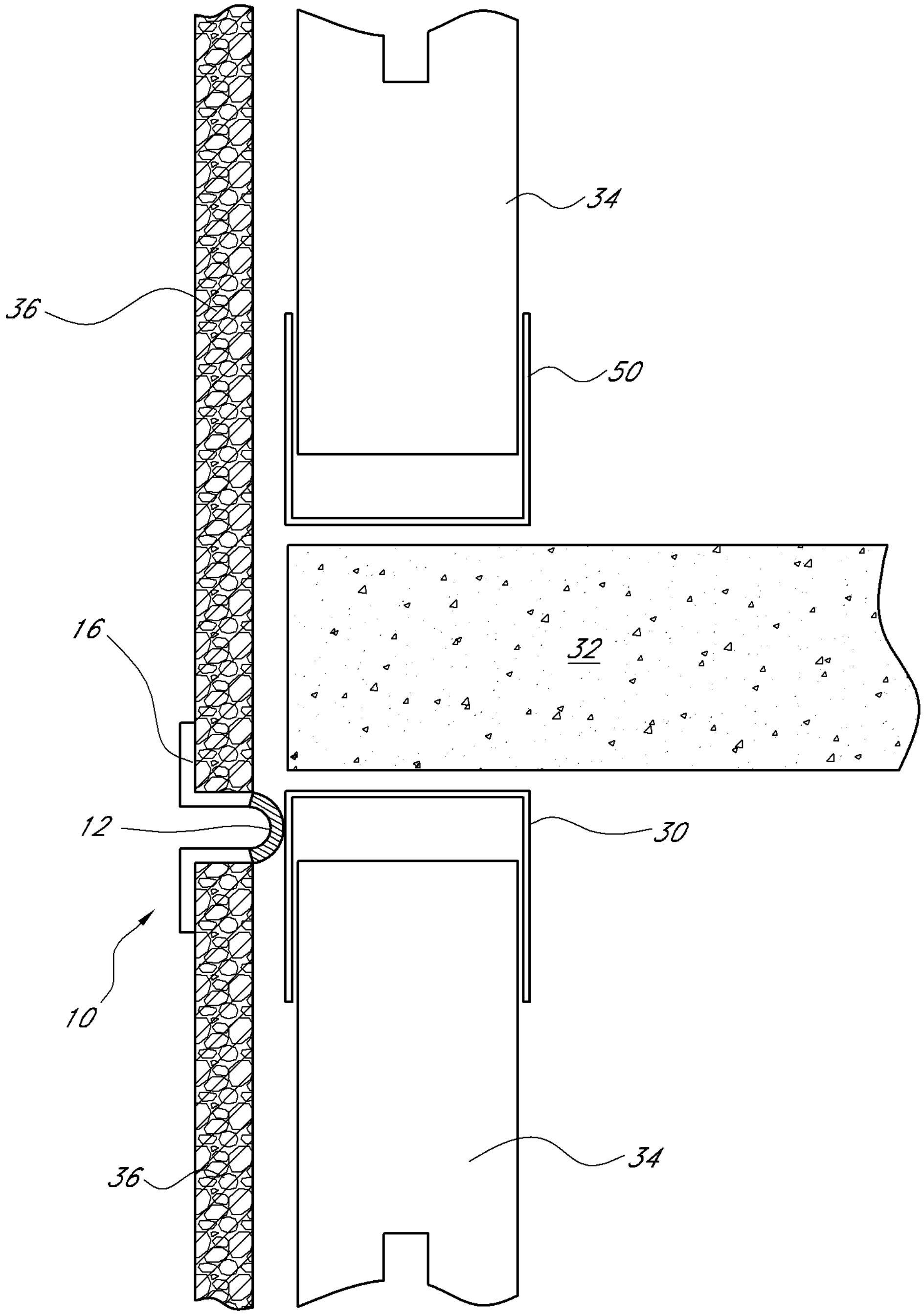
FIG. 9 is a cross-sectional view of an interior or exterior wall assembly with a deflection gap between the upper and lower wallboards or sheathing.

With reference to FIG. 9, another embodiment of a fire block strip 10 is illustrated protecting a gap in an interior or exterior wall assembly. The wall assembly includes a first (lower) wall portion, which includes a stud wall having a bottom track (not shown), a plurality of studs 34, a header track 30 and a wallboard member 36. The wall assembly also includes a second (upper) wall portion having a bottom track 50, a plurality of studs 34, a header track (not shown) and a wallboard member 36. The upper and lower wall portions are separated by a horizontal support structure, such as a floor 32. As noted, the wall assembly can be interior or exterior. In an interior wall assembly, the wallboard members 36 may be drywall. In an exterior wall assembly, the wallboard members 36 may be any type of suitable exterior sheathing element.

As illustrated, a horizontal deflection (or drift) gap exists between the upper and lower wallboard members 36 to accommodate relative vertical (or horizontal) movement between the wallboard members 36 (and upper and lower wall portions). The fire block strip 10 is positioned in the deflection gap to seal the gap in the event of a fire. The fire block strip 10 may be similar to any of the strips 10 described above and, preferably, includes at least and intumescent strip 12 and a cover layer 16. The width of the intumescent strip 12 preferably is substantially equal to or greater than the width of the deflection gap. The cover layer 16 preferably includes adhesive on its underneath surface to permit the fire block strip 10 to be affixed to the wallboard members 36. The width of the cover layer 16 preferably is influenced by the thickness of the wallboard members 36. Preferably, the cover layer 16 is wide enough such that each side extends from the intumescent strip 12 along the edge of the wallboard member 36 facing the gap and onto the outer surface of the wallboard member 36 a sufficient distance to achieve an adhesive bond strong enough to secure the fire block strip 10 in place. Thus, preferably, the entire width of the fire block strip 10 is greater than the width of the deflection gap in its widest position plus the thickness of each of the wallboard members 36 defining the deflection gap. Preferably, the width of the fire block strip 10 is greater than this width by an amount suitable to permit secure adhesion of the outer edges of the strip 10 to the outer surfaces of the wallboard members 36, which may be determined by the type of adhesive employed. Furthermore, other suitable methods in addition or in the alternative to adhesives may be used, such as mechanical fasteners, for example.

Figure 10:
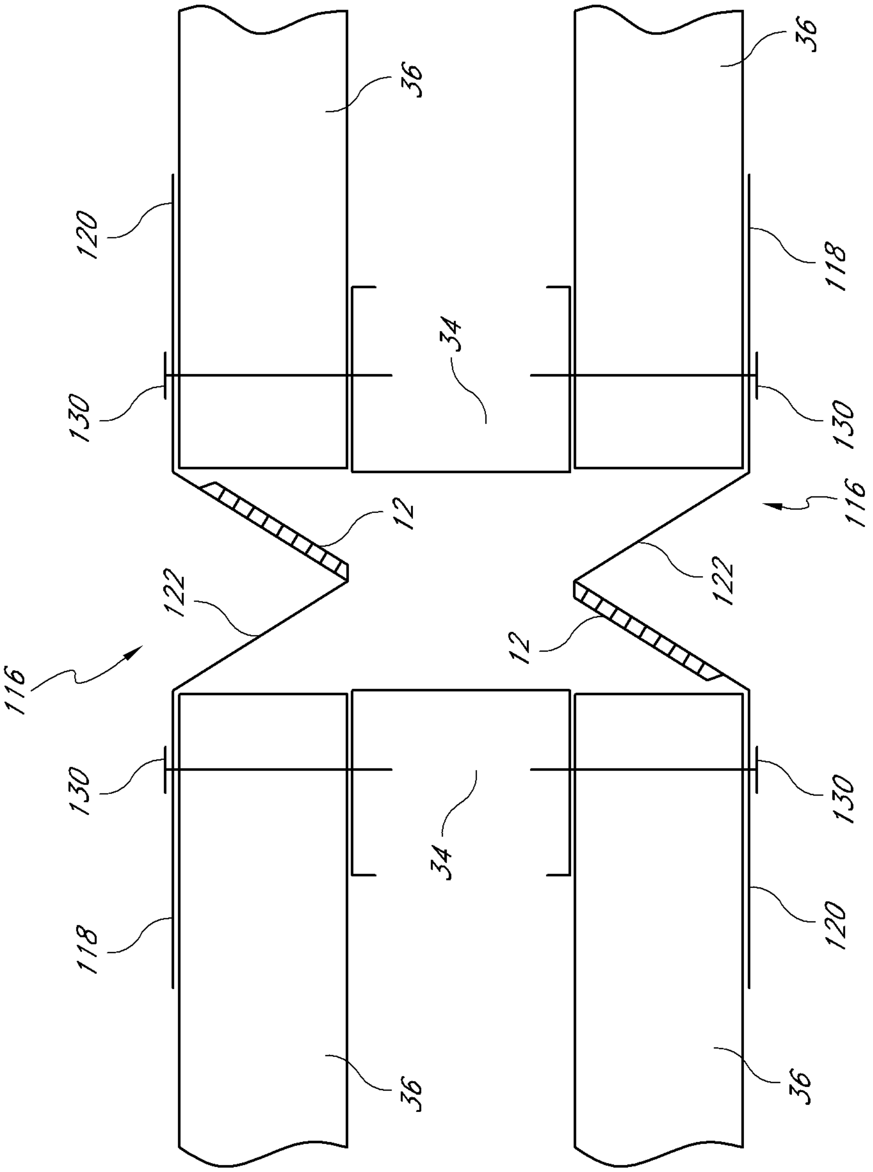
FIG. 10 is a cross-sectional view of another interior or exterior wall assembly with a deflection gap between the adjacent wallboards or sheathing.

With reference to FIG. 10, another embodiment of a fire block wall component is illustrated protecting a gap in an interior or exterior wall assembly. The wall assembly includes a first wall portion having a stud wall having a bottom track (not shown), a plurality of studs 34, a header track (not shown), and at least one wallboard member 36. The wall assembly also includes a second wall portion having a stud wall having a header track (not shown), a plurality of studs 34, a bottom track (not shown), and at least one wallboard member 36. In an interior wall assembly, the wallboard members 36 may be drywall. In an exterior wall assembly, the wallboard members 36 may be any type of suitable exterior sheathing element. In some embodiments, the wall component may be positioned on either side of the stud wall, as in FIG. 10, on the outside (as shown) or inside (captured between the studs 34 and the wallboard member 36) of the wallboard members 36.

As illustrated, a vertically-extending deflection gap exists between the wallboard members 36 of the first wall portion and the second wall portion to accommodate relative horizontal (or vertical) movement between the wallboard members 36, as is described above and illustrated in FIG. 8. A fire-block wall component 116, which can also be referred to as a "control joint," is positioned to extend lengthwise along and across the deflection gap between the wallboard member 36 of the first wall portion and the wallboard member 36 of the second wall portion. A second fire-block wall component 116 may be similarly positioned in the other gap existing between the wallboard members secured to the opposite side of the wall studs 34.

In one embodiment, the fire-block wall component 116 includes a V-shaped central portion 122 and a pair of side portions 118 and 120 extending in opposite directions from the central portion 122. The V-shaped central portion 122 and the side portions 118 and 120 preferably includes at least one layer of material and may be made of a single metal piece or they may be made of multiple metal pieces welded or otherwise affixed together. For example, the central portion 122 and side portions 118 and 120 can be made from a zinc material, other suitable metal materials or non-metallic materials, such as plastic, for example. In other arrangements, multiple material layers can be used (e.g., a composite construction). The fire-block wall component 116 also includes a fire-resistant material strip 12 attached along the length of one side of the V-shaped central portion 122. In another embodiment, the fire-resistant material strip 12 may be attached along the length of either side or both sides of the V-shaped central portion 122. In the illustrated arrangement, the fire-resistant material strip 12 is positioned on an interior surface of the component 116; however, in other arrangements, the fire-resistant material strip 12 could be positioned on an exterior surface of the component 116, in addition or alternative to the interior surface. The fire-resistant material strip 12 may be an intumescent material the same as or similar to those described elsewhere herein that is secured to the fire-block wall component 116 using a bonding adhesive, other similar adhesive means or other suitable arrangements, including mechanical fasteners, for example. The side portions 118 and 120 are secured to the wallboard members 36 on either side of the gap by nails 130 or other securing means (such as screws, etc.). The side portions 118 and 120 may be secured to the outside surface of the wallboard members 36 or they may be secured to the inside surface of the wallboard members 36.

Preferably, the V-shaped central portion 122 is positioned between the wallboard members 36 such that the V-shaped central portion 122 is positioned within the gap (i.e., partially or completely between the exterior and interior surfaces of the wallboard members 36). The width of the V-shaped central portion 122 is preferably substantially equal to the width of the deflection gap. Preferably, the V-shaped central portion 122 is wide enough such that the V extends at least from the edge of the wallboard member 36 of the first wall portion facing the gap to the edge of the wallboard member 36 of the second wall portion facing the gap. In this configuration, the fire-resistant material strip 12 can expand and seal the gap in the event of a fire, as is described above with respect to similar embodiments.

In some embodiments, such as that shown in FIG. 10, two wall studs 34 may be located close to or adjacent the deflection gap. In other configurations, one wall stud 34 may be located close to or adjacent one side of the deflection gap and, in some arrangements, can have a support arrangement (e.g., another stud or stack of wallboard-material strips) attached thereto that extends across the deflection gap and provides support to the wallboard member(s) 36 on the other side of the deflection gap. In other arrangements, a wall stud 34 could bridge the deflection gap as shown in FIG. 8.

Figure 11:
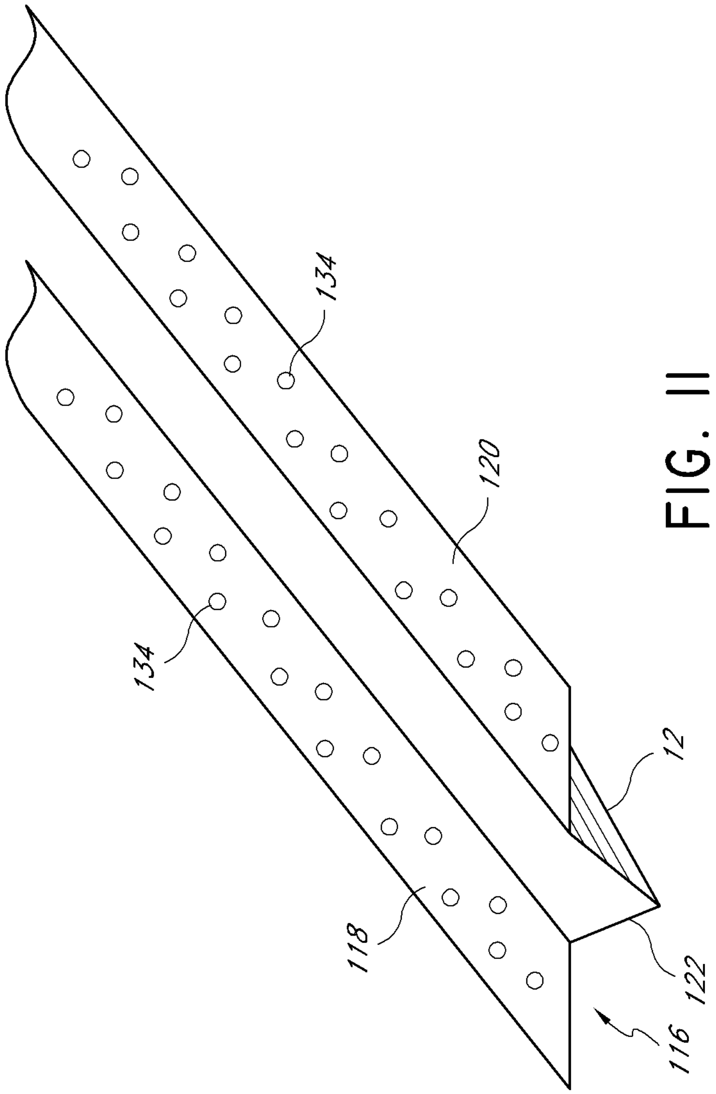
FIG. 11 is a perspective view of a fire block wall component having certain features, aspects, and advantages of the present invention.

FIG. 11 illustrates one embodiment of the fire-block wall component 116 as discussed above with respect to FIG. 10 and separated from the wall assembly. As discussed above, the fire-block wall component 116 includes a V-shaped central portion 122 with side portions 118 and 120 extending in opposite directions from the V-shaped central portion 122. Preferably, the fire-block wall component is a metal profile formed by any suitable method, such as bending, extruding or roll-forming, but could be constructed from any other suitable material (e.g., plastic) via any other suitable manufacturing process. A fire-resistant material 12, such as an intumescent material, is attached lengthwise to one side of the V-shaped central portion 122. In other configurations, the fire-resistant material 12 may be attached to the other side of the V-shaped central portion 122 or may be attached to both sides of the V-shaped central portion 122 on either an interior or exterior surface of the component 116. The fire-resistant material 12 could also or alternatively be applied to one or both side portions 118 and 120, if desired. A plurality of openings 134 may be provided in one or both side portions 118 and 120 to receive nails, screws or other mechanical fastening means to secure the side portions 118 and 120 to wallboard members 36 and/or wall studs 34. The side portions 118 and 120 could be secured to the wallboard members 36 by other suitable arrangements or mechanisms, as well, including adhesives, for example.

The disclosed fire block strips 10 are well-suited for application in the field to a variety of different head-of-wall structures, including both metal header tracks and wood headers, among other possibilities. However, the fire block strip 10 may also be applied as a part of the manufacturing process, as the cover layer 16 provides protection for the intumescent strip 12 (and foam strip 14, if present) during transport and storage. In addition, the fire block strip 10 can be applied to a wall construction product in the locations and applications shown in U.S. Pat. Nos. 7,617,643; 8,087,205; 7,752,817; 8,281,552; and 2009/0178369, assigned to the Assignee of the present application, which are incorporated by reference herein in their entireties.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present fire block device, system and method has been described in the context of particularly preferred embodiments, the skilled artisan will appreciate, in view of the present disclosure, that certain advantages, features and aspects of the device, system and method may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A fire-rated wall assembly comprising:

an overhead structure;

a plurality of vertical wall studs;

a track for receiving the plurality of vertical wall studs, the track connected to the overhead structure, the track comprising a web, a first flange and a second flange, the first and second flanges extending in the same direction from opposite edges of the web to form a U-shape;

a wallboard supported by the plurality of vertical wall studs, wherein the plurality of vertical wall studs are movable relative to the track, wherein the wallboard is spaced apart from the overhead structure to define a deflection gap between an upper edge of the wallboard and the overhead structure; and a fire block strip extending along the deflection gap and configured to block the passage of fire and smoke through the deflection gap, the fire block strip comprising:

an intumescent material portion;

a foam material portion; and an adhesive layer;

wherein a first portion of the fire block strip is positioned between the first flange and the wallboard and attached to the first flange by the adhesive layer, and a second portion of the fire block strip is bent at an angle with respect to the first portion and contacts the overhead structure to seal the deflection gap, wherein the intumescent material portion, the foam material portion, and the adhesive layer form an integrated structure.

2. The fire-rated wall assembly of claim 1, wherein the adhesive layer extends across the first and second portions of the fire block strip.

3. The fire-rated wall assembly of claim 1, wherein the adhesive layer extends across the intumescent portion and the foam material portion.

4. The fire-rated wall assembly of claim 1, wherein the first portion extends from a lower end of the fire block strip up to a corner between the first flange and the web of the track.

5. The fire-rated wall assembly of claim 1, wherein the first portion is aligned parallel with the first flange and the second portion is aligned parallel with the web.

6. The fire-rated wall assembly of claim 1, wherein first portion includes the intumescent portion.

7. The fire-rated wall assembly of claim 1, wherein second portion includes the foam material portion.

8. The fire-rated wall assembly of claim 7, wherein foam material portion contacts the overhead structure.

9. The fire-rated wall assembly of claim 8, wherein the second portion is positioned between the web and the overhead structure and the foam material portion is compressed between the web and the overhead structure.

10. The fire-rated wall assembly of claim 1, wherein second portion extends above the web of the track.

11. The fire-rated wall assembly of claim 1, wherein contact between the second portion and the overhead structure is through a protective layer of the fire block strip.

12. The fire-rated wall assembly of claim 11, wherein the protective layer is attached with the web of the track.

13. The fire-rated wall assembly of claim 1, wherein the angle between the first portion and the second portion is approximately 90°.

14. The fire-rated wall assembly of claim 1, wherein the foam material portion comprises a compressible open or closed cell structure.

15. The fire-rated wall assembly of claim 1, wherein the foam material portion comprises a polyester or polyether material.

16. The fire-rated wall assembly of claim 1, wherein the intumescent material portion and the foam material portion are positioned side-by-side.

17. The fire-rated wall assembly of claim 1, wherein the fire block strip extending along the deflection gap with the angle between the first portion and the second portion is in an unexpanded configuration and is configured to expand to an expanded configuration when exposed to sufficient heat.

18. A fire-rated wall assembly comprising:

an overhead structure;

a plurality of vertical wall studs;

a track for receiving the plurality of vertical wall studs, the track connected to the overhead structure, the track comprising a web, a first flange and a second flange, the first and second flanges extending in the same direction from opposite edges of the web to form a U-shape;

a wallboard supported by the plurality of vertical wall studs, wherein the plurality of vertical wall studs are movable relative to the track, wherein the wallboard is spaced apart from the overhead structure to define a deflection gap between an upper edge of the wallboard and the overhead structure; and a fire block strip extending along the deflection gap and configured to block the passage of fire and smoke through the deflection gap, the fire block strip comprising:

a first portion positioned between the wallboard and the first flange, the first portion comprising an intumescent material;

a second portion contacting the overhead structure, the second portion comprising a foam material;

a bend between the first portion and the second portion;

an adhesive layer extending across the first portion and the second portion;

wherein the first portion of the fire block strip is attached to the first flange by the adhesive layer and the bend is aligned with a corner between the web and the first flange, wherein the first portion and the second portion form an integrated structure.

19. The fire-rated wall assembly of claim 18, wherein the fire block strip includes an intumescent material portion and a foam material portion.

20. A fire-rated wall assembly comprising:

an overhead structure;

a plurality of vertical wall studs;

a track for receiving the plurality of vertical wall studs, the track connected to the overhead structure, the track comprising a web, a first flange and a second flange, the first and second flanges extending in the same direction from opposite edges of the web to form a U-shape;

a wallboard supported by the plurality of vertical wall studs, wherein the plurality of vertical wall studs are movable relative to the track, wherein the wallboard is spaced apart from the overhead structure to define a deflection gap between an upper edge of the wallboard and the overhead structure; and a fire block strip extending along the deflection gap and configured to block the passage of fire and smoke through the deflection gap, the fire block strip comprising:

a first portion extending along the first flange and attached to the first flange by an adhesive layer;

a second portion contacting the overhead structure, the second portion positioned between the first portion and the overhead structure;

wherein the second portion of the fire block strip is aligned with a corner between the web and the first flange;

wherein the first portion of the fire block strip includes an intumescent material portion and the second portion includes a foam material portion, wherein the first portion and the second portion form an integrated structure.

* * * * *